United States Patent [19]
Robbins et al.

[11] Patent Number: 5,678,643
[45] Date of Patent: Oct. 21, 1997

[54] ACOUSTIC LOGGING WHILE DRILLING TOOL TO DETERMINE BED BOUNDARIES

[75] Inventors: Carl Arthur Robbins, Tomball; A. J. Mallett; John Wesley Minear, both of Houston,; Batakrishna Mandal, Missouri City; James Robert Birchak, Spring; Eugene Joseph Linyaev, Houston, all of Tex.

[73] Assignee: Halliburton Energy Services, Inc., Houston, Tex.

[21] Appl. No.: 544,723

[22] Filed: Oct. 18, 1995

[51] Int. Cl.⁶ .................................................. F21B 7/00
[52] U.S. Cl. .................................... 175/45; 166/255.2
[58] Field of Search ........................... 175/26, 45, 61; 166/255.2, 250.16, 254.2

[56] References Cited

U.S. PATENT DOCUMENTS

| Re. 33,751 | 11/1991 | Geczy et al. | 175/61 |
|---|---|---|---|
| 3,823,787 | 7/1974 | Haworth et al. | 175/61 X |
| 4,786,874 | 11/1988 | Grosso et al. | 175/45 X |
| 5,230,386 | 7/1993 | Wu et al. | 175/45 |

OTHER PUBLICATIONS

Author Unknown; Measurements at the Bit: A New Generation of MWD Tools; Apr./Jul., 1993; pp. 44–54; Place of Publication unknown.

Jan Arve Olsen, Potential of MWD Tools; Mar. 1993; pp. 17–18; Place of Publication unknown.

E. Iversen Nakken, O. Baltzersen and A. Kristensen; Characteristics of Drill Bit Generated Noise; Jun. 1990; pp. 1–11; Place of Publication unknown.

GEC–Marconi Ltd., Looking Ahead of the Bit Proof of Concept Study Proposal for Service Companies; Sep., 1993; pp. 1–12; Place of Publication unknown.

IKU Sintef Group; IKU Targets position Logging Tools; Date unknown, 4 pages; Place of Publication unknown.

Primary Examiner—William P. Neuder
Attorney, Agent, or Firm—Conley, Rose & Tayon, PC

[57] ABSTRACT

A LWD tool is disclosed for detecting the existence of and distance to adjacent bed boundaries. A transmitter assembly generates either a short acoustic pulse or a swept frequency signal that is detected by an associated receiver assembly. The received signal(s) are conditioned and converted to high precision digital signals by an A/D converter. The digitized signals are accumulated and transferred to a digital signal processor via a high speed data bus. The digital signal processor also receives a digital signal representing the transmission signal and compares the transmission signal and the received signals together to enable a downhole microprocessor to derive a time lag for the received signals. The microprocessor can transmit the time lag signal to the surface via a mud pulse for real-time control, or can operate as part of a closed loop drilling system to automatically control inclination of the drilling assembly to stay within, or to enter, a pay zone based upon the time lag associated with the received signals, and the measured speed of sound of the formation. In one embodiment, the receivers in the receiver array are steered to investigate various volume cells in the formation. A time delay is determined based on the volume cell, which is used to align and sum the received signals. The maximum sum value then is used as indicative of a bed boundary in that particular volume call.

75 Claims, 21 Drawing Sheets

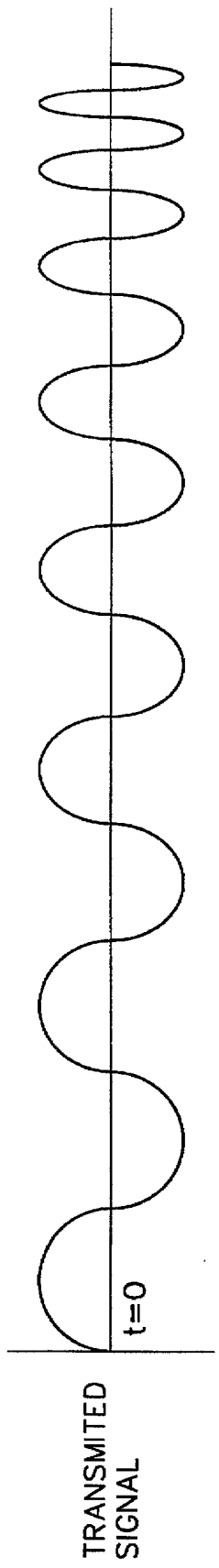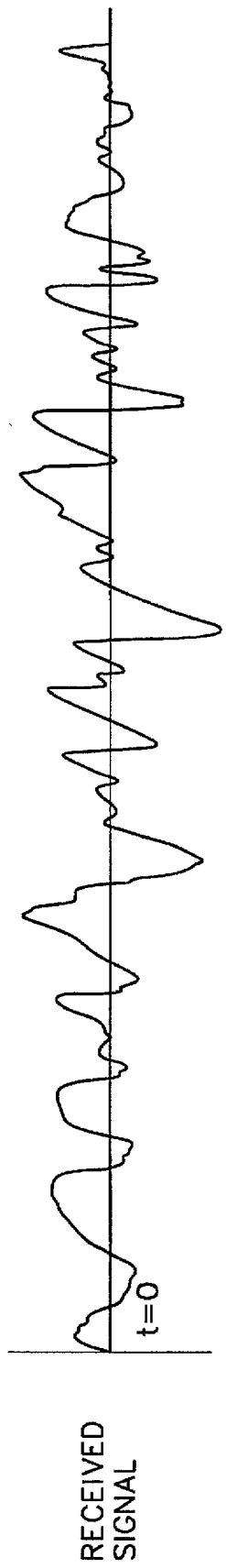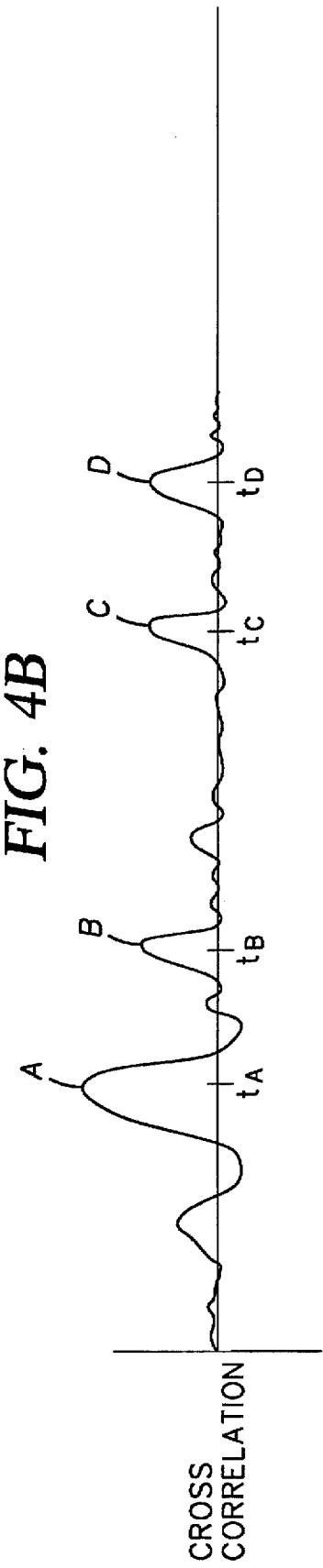

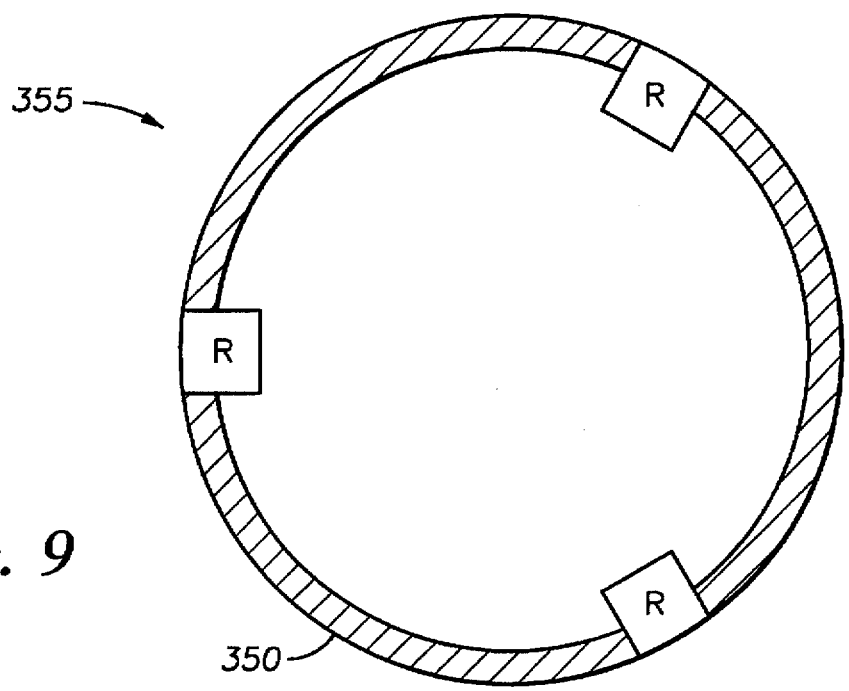
FIG. 9
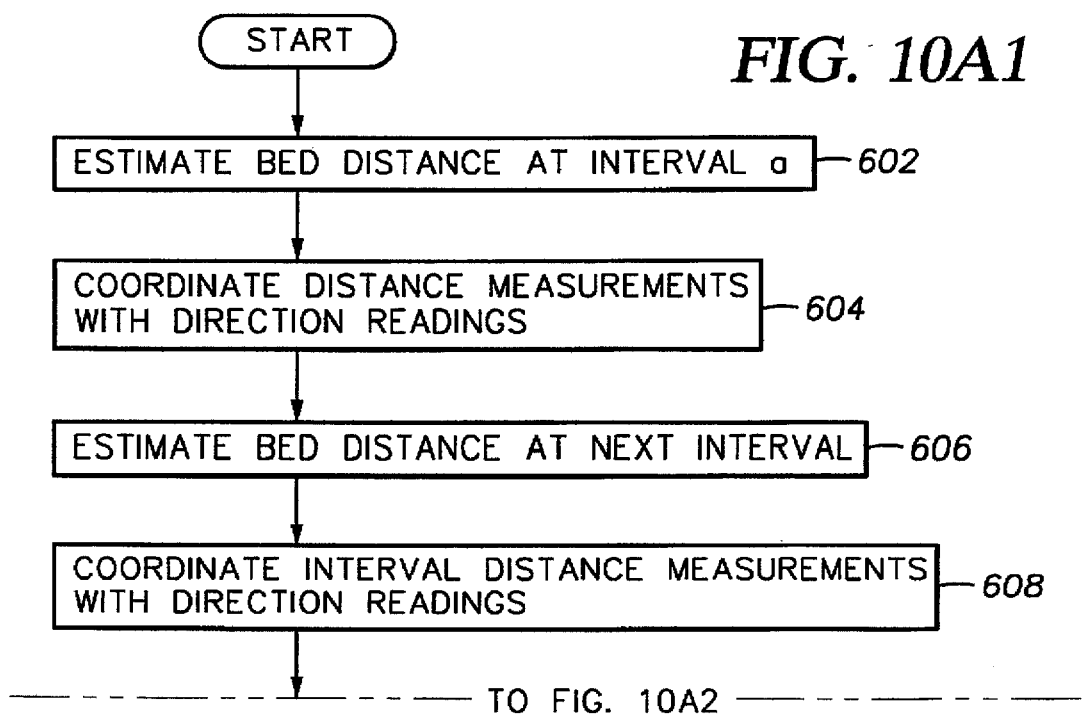
FIG. 10A1

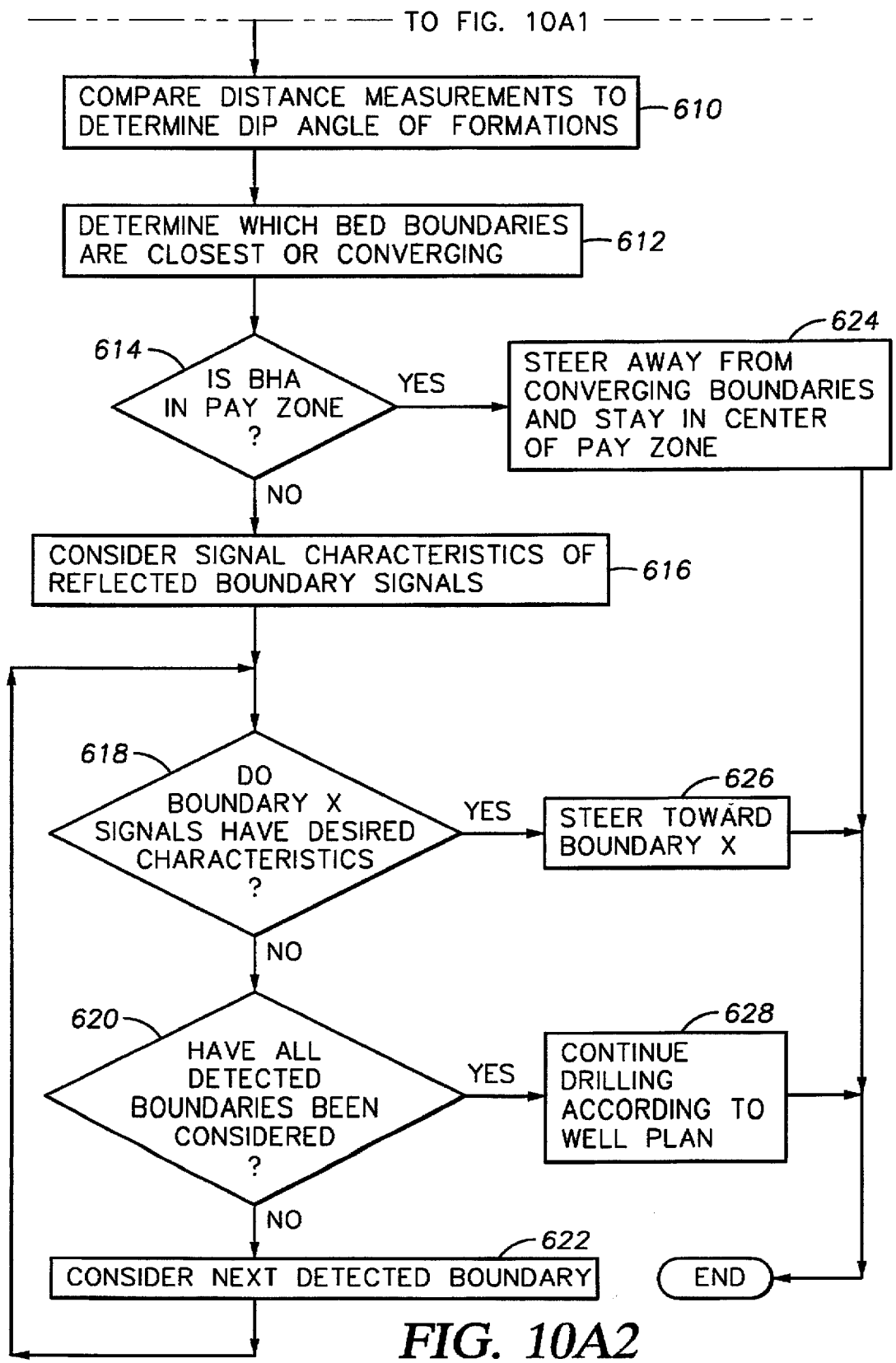
FIG. 10A2

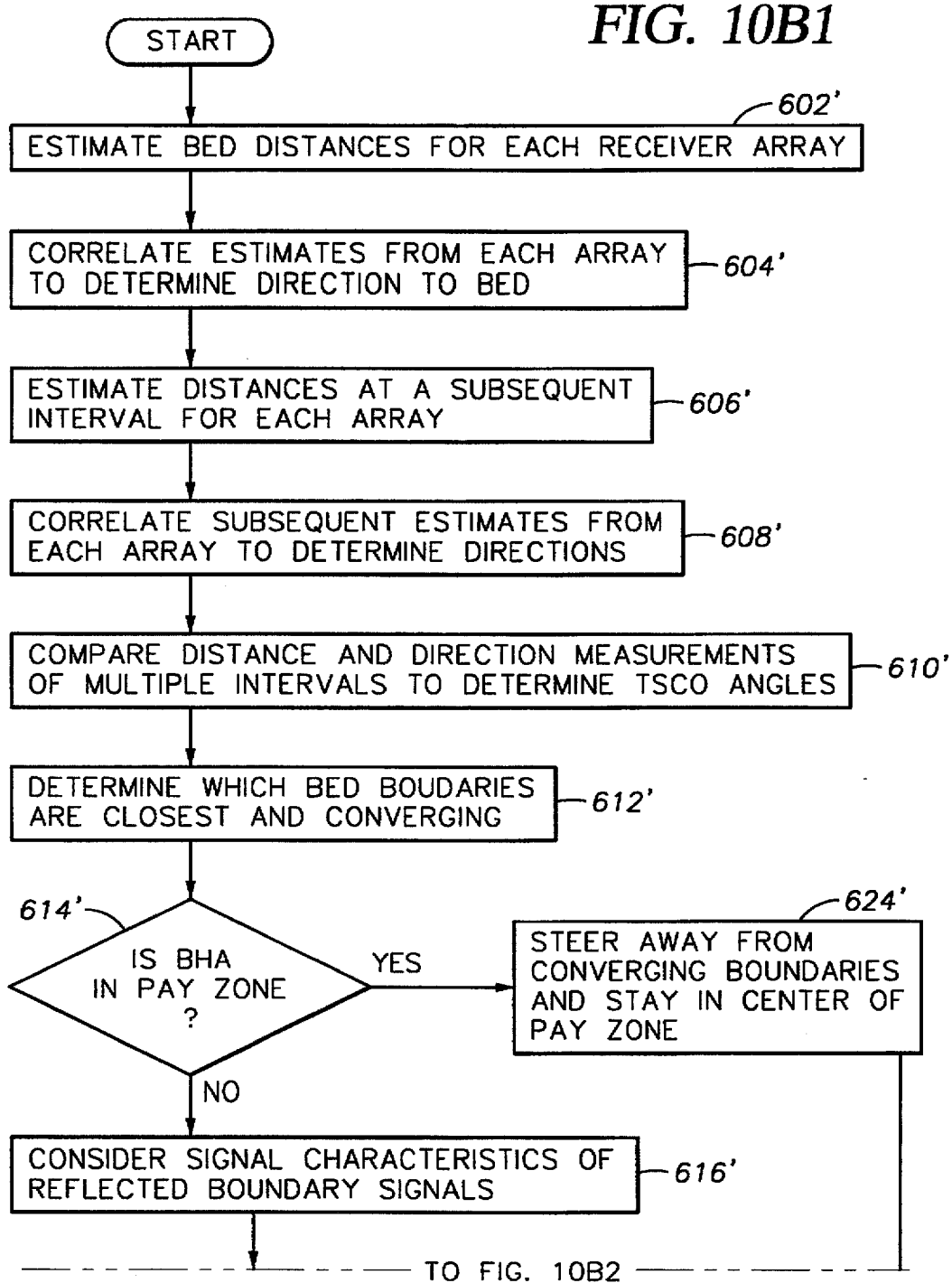
FIG. 10B1

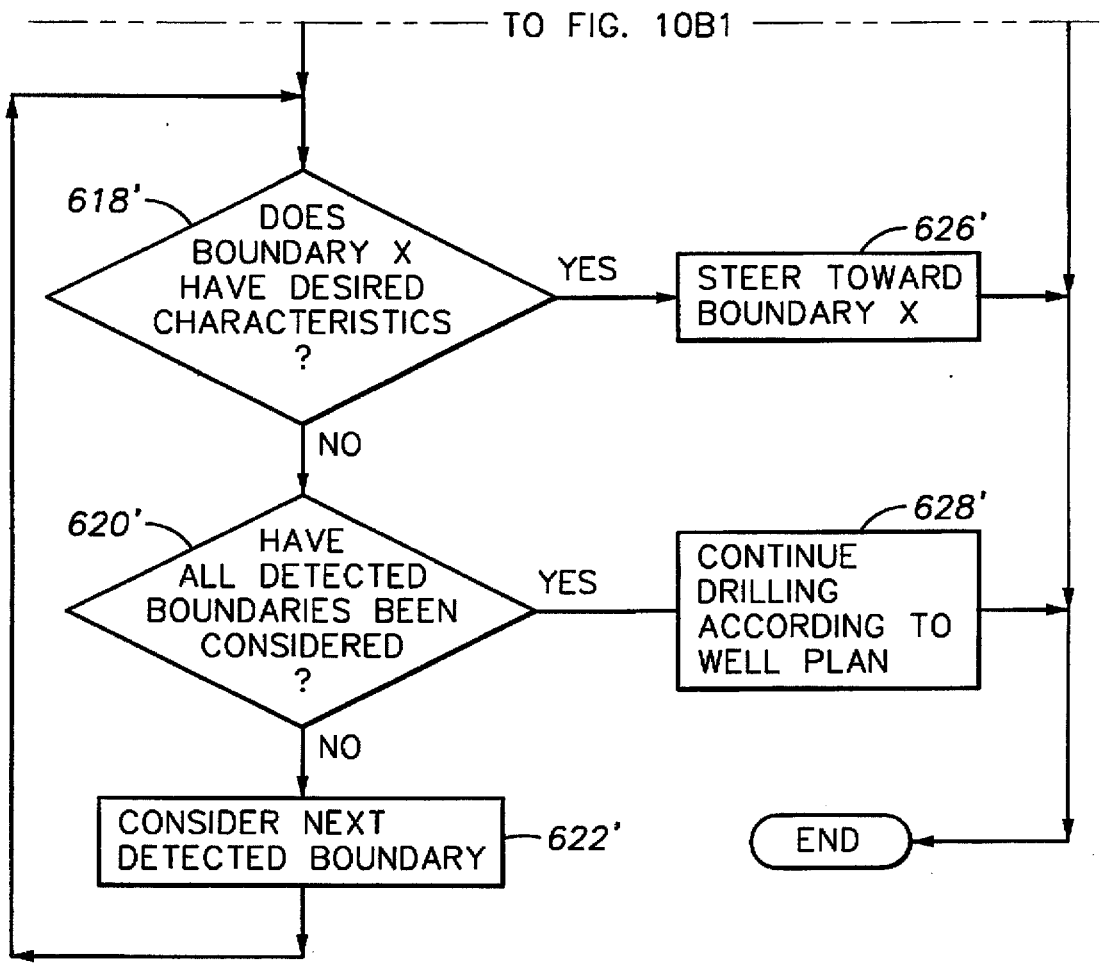
FIG. 10B2

ACOUSTIC LOGGING WHILE DRILLING TOOL TO DETERMINE BED BOUNDARIES

BACKGROUND OF THE INVENTION

The present invention relates generally to a system for steering a bottomhole drilling assembly based upon the geological characteristics of the formation through which the drill bit is drilling. More particularly, the invention relates to a bottomhole drilling assembly that includes a logging while drilling ("LWD") sub-system for determining formation characteristics during the drilling of a well, and using that information to geologically steer or "geosteer" the bottomhole assembly. Still more particularly, the present invention relates to a device that determines the distance to and orientation of bed boundaries of formations adjacent to and ahead of the drilling assembly using an acoustic LWD system.

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting energy returning from the formation. Various sensors have been used to determine particular characteristics of the formation, including nuclear sensors, acoustic sensors, and electrical sensors. See generally J. Lab, *A Practical Introduction to Borehole Geophysics* (Society of Exploration Geophysicists 1986); D. R. Skinner, *Introduction to Petroleum Production*, Volume 1, at 54–63 (Gulf Publishing Co. 1981).

For a formation to contain petroleum, and for the formation to permit the petroleum to flow through it, the rock comprising the formation must have certain well known physical characteristics. One characteristic is that the rock in the formation have space to store petroleum. If the rock in a formation has openings, voids, and spaces in which oil and gas may be stored, it is characterized as "porous." Thus, by determining if the rock is porous, one skilled in the art can determine whether or not the formation has the requisite physical properties to store and yield petroleum. See D. R. Skinner, *Introduction to Petroleum Production*, id. at 8.

Acoustic sensors commonly are used to measure porosity of the formation by determining the amount of time it takes the acoustic wave to travel through the formation. The porosity of the formation through which the acoustic wave travels influences the speed of sound in that formation. By determining the speed of sound of a formation, valuable insight can be obtained regarding formation porosity and other formation characteristics. Examples of acoustic wireline tools are U.S. Pat. Nos. 3,237,153, 3,312,934, 3,593, 255, 4,649,525, 4,718,046, 4,869,349, and 5,069,308. Typically, the acoustic wireline tools include one or more acoustic transmitters and one or more acoustic receivers. Acoustic waves are generated by the transmitter(s) and are transmitted into the formation adjacent the wellbore. Acoustic signals refract to the receivers, and a travel time for the wave is determined, typically at the surface of the well. From this travel time, and knowing the spacing between the receivers, speed of sound of the formation can be calculated, which then can be correlated to porosity.

While wireline logging is useful in assimilating information relating to formations downhole, it nonetheless has certain disadvantages. For example, before the wireline logging tool can be run in the wellbore, the drill string must first be removed or tripped from the borehole, resulting in considerable cost and loss of drilling time for the driller (who typically is paying daily fees for the rental of drilling equipment). In addition, because wireline tools are unable to collect data during the actual drilling operation, drillers must make some decisions (such as the direction to drill, etc.) without sufficient information, or else incur the cost of tripping the drill string to run a logging tool to gather more information relating to conditions downhole. In addition, because wireline logging occurs a relatively long period after the wellbore is drilled, the accuracy of the wireline measurement is questionable. As one skilled in the art will understand, the wellbore conditions tend to degrade as drilling fluids invade the formation in the vicinity of the wellbore.

Because of these limitations associated with wireline logging, there recently has been an increasing emphasis on the collection of data during the drilling process itself. By collecting and processing data during the drilling process, without the necessity of tripping the drilling assembly to insert a wireline logging tool, the driller can make accurate modifications or corrections "real-time", as necessary, to optimize performance. Moreover, the measurement of formation parameters during drilling, and hopefully before invasion of the formation, increases the integrity of the measured data. Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the movement and position of the drilling assembly while the bottomhole assembly is in the well.

The measurement of formation properties during drilling of the well by LWD systems increases the timeliness of measurement data and, consequently, increases the efficiency of drilling operations. While LWD data is valuable in any well, those in the oil industry have realized the special importance of LWD data in wells drilled with a steerable bottomhole assembly. The basic concept of a steerable system is detailed in commonly assigned U.S. Pat. No. Re. 33,751, the teachings of which are incorporated herein. As set forth in that patent, the steerable bottomhole assembly permits the drill bit to be selectively steered in a particular direction, or to drill straight ahead, with the same bottomhole assembly.

The steerably bottomhole assembly has greatly increased the options available to the driller during the drilling of a well. In particular, the steerable bottomhole assembly makes it possible to drill horizontal wells, or other wells which can track the reservoir dip angle. As one skilled in the art will understand, reservoirs of hydrocarbons, or "pay zones", are located in particular rock formations. These rock formations, or beds, rarely lay in a true horizontal plane. Instead, the boundaries of these formations may dip, curve, or otherwise change. It is the goal of the driller to maintain a path through the pay zone during the drilling of a deviated or horizontal well. The greater the length that the wellbore stays in the pay zone, the greater is the potential recovery of hydrocarbons.

Even with the steerable system, however, it can be difficult to stay in the pay zone during drilling. If the actual trajectory of the wellbore varies even slightly from the proposed trajectory, or if the proposed trajectory does not track the pay zone boundaries, the drill bit may exit the pay zone. Time is then wasted as the driller steers the bit back into the pay zone.

Typically, LWD measurements are used to provide information regarding the particular formation in which the borehole is traversing. During the last several years, many in the industry have noted the desirability of an LWD system that could be especially used to detect bed boundaries and to provide real-time data to the driller to enable the driller to make course corrections to stay in the pay zone. See, e.g. Olsen, "Potential of MWD Tools," Euroil, March 1993, pp. 17–18. Alternatively, the LWD system could be used as part of a "Smart" system to automatically maintain the drill bit in the pay zone. See, e.g. commonly assigned U.S. Pat. No. 5,332,048, the teachings of which are incorporated by reference herein. The assignee has also developed a system which permits the measurement of LWD data at the drill bit to provide an earlier indication of bed boundaries and formation characteristics. See U.S. Pat. No. 5,160,925.

Logging sensors that commonly are used as part of an LWD system are resistivity and gamma ray sensors. Acoustic measurement devices currently are being experimented with and implemented by the assignee and other companies for use in LWD systems to determine formation porosity while drilling. See, e.g. "Sonic While Drilling—Real-Time Data to Guide Real-Time Decisions," Schlumberger Oilfield Services catalogue. The current focus of acoustic measurements in LWD systems, which corresponds to measurements obtained by wireline logging, is to develop additional data relating to formation porosity by determining the formation speed of sound. The implementation of acoustic logging tools in a LWD system, however, is greatly complicated as compared to a wireline tool because of the presence of extraneous noise downhole. Thus, the noise generated by drilling, the flow of mud through the drill string, the grinding of the drilling components, and other mechanical and environment noises present downhole make it difficult for the acoustic transducers to receive the transmitted acoustic wave and to isolate the received acoustic wave from the extraneous noise that also is detected by the acoustic receiver.

Despite these inherent difficulties of using an acoustic sensing device simultaneously with the drilling of a borehole, the characteristics of acoustic signals raise the possibility of obtaining other measurements in addition to porosity. Some have even suggested using the noise generated by the drill bit to determine formation properties and/or boundaries. See, Nakken, et. al "Characteristics of Drill Bit Generated Noise," SPWLA 31st Annual Logging Symposium, Jun. 24–27, 1990. It would be advantageous to use the principles of acoustic waves for these other measurements. In particular, it would be advantageous to develop an acoustic LWD system that can survey the formation surrounding and ahead of the bottomhole assembly formation to determine (1) the existence of adjacent bed boundaries, (2) the distance to the bed boundaries, and (3) the orientation of the bed boundaries. By ascertaining the location and orientation of bed boundaries, the inclination of the bottomhole system can be modified as desired to stay in, or to enter, a pay zone. Thus, for example, if the bottomhole assembly currently is drilling in a pay zone, but a converging bed boundary is detected, the inclination of the bottomhole assembly can be modified to stay in the pay zone. Alternatively, if the bottomhole assembly is not in a pay zone but an adjacent boundary is expected to yield hydrocarbons, the bottomhole assembly could be directed toward the adjacent boundary.

While the advantages of determining bed boundaries is immediately apparent to one skilled in the art, to date no one has successfully implemented an acoustic system for determining bed boundaries while drilling and for controlling the drilling of the well in response to bed boundary detection.

SUMMARY OF THE INVENTION

The present invention solves the shortcomings and deficiencies of the prior art by implementing an acoustic LWD system for determining bed boundaries during drilling. In an exemplary embodiment, the distance to the bed boundary determined by the LWD) system then can be used by a downhole microcontroller to control the direction or inclination at which the well is drilled. Alternatively, the bed boundary distances can be transmitted via a mud pulse signal to the surface to provide real-time information to a driller.

In the preferred embodiment, the LWD tool includes a transmitter/receiver array for sending acoustic signals into the formations surrounding the wellbore and receiving returning acoustic signals (including reflections and refractions). In the preferred embodiment, a pair of acoustic transmitters are provided on the upper and lower end of the LWD tool, between which a plurality of receivers are spaced. The transmitters are fired alternately, and the signals detected by the receivers are independently processed and correlated. In the preferred embodiment, the acoustic logging tool is used to determine the speed of sound of the formation and to calculate distances to adjacent bed boundaries, including bed boundaries surrounding the borehole, and bed boundaries ahead of the bit.

In one exemplary embodiment, the acoustic transmitters fire relatively short acoustic pulses into the formation. The acoustic signals detected by the receivers are filtered to remove extraneous noise from the drilling process, and to eliminate undesirable signals, such as the acoustic waves travelling through the logging tool itself. In addition, the time between transmission and receipt of the acoustic signals is measured. The speed of sound or velocity determined by the acoustic LWD system is used together with the time measurement of bed boundary reflections to perform a normal move-out geometric correction for each of the received signals. After the geometric correction is made, the waveforms received during a predetermined period or depth are stacked to obtain an averaged waveform. From this waveform, distances to, and orientations of, the respective bed boundaries relative to the tool axis can be estimated. By repeating this procedure in multiple steering and collimation directions periodically at multiple depths, the bed boundary determination can be correlated to improve the accuracy of the approximation, and to provide an indication of the bed dip angle with respect to the borehole. The above technique can be used when the tool is rotating, or when the tool is stationary in the borehole. In addition, the tool may be fired based upon a preset periodic interval, or can be fired based upon the measured azimuthal and tool face measurements, so that the tool is fired in one or more desired directions to measure the distance to boundaries in a particular direction in a plane perpendicular to the tool axis.

In another embodiment, transmitter/receiver arrays are positioned on opposite sides of the acoustic logging tool, in a staggered configuration. By providing this configuration, the orientation of the bed boundary in a plane perpendicular to the tool axis can be determined with respect to the borehole without rotating the tool. The location of the boundaries is determined by comparing the detection times of the reflected signals between the diametrically opposed receiver arrays. The receiver array which receives the reflected signal first indicates on which side of the borehole the boundary lies. Another embodiment presented herein uses multiple receiver arrays between transmitters to provide more resolution on the bed boundary direction. In this embodiment, each receiver array comprises three transducers spaced equidistantly around the circumference of the tool. The use of three receiver transducers configured in this manner improves direction resolution in the plane perpendicular to the tool axis.

In another possible embodiment, pulse/echo acoustic transducers are used to detect distances to bed boundaries. If the pulse/echo transmitter and receiver are physically small compared to the acoustic wavelength, the omnidirectional radiation patterns detect the arrival of signals reflected from the closest bed boundary points. To increase the directivity of the acoustic wave, a plurality of transducers extending a wavelength or more along the tool could be fired sequentially. The signals received at the receivers then are appropriately time delayed to implement array steering. Array steering improves the signal-to-noise ratio for the steered direction and thereby functions to enhance the characteristics of the received acoustic signals.

In another exemplary embodiment of the invention, the LWD system includes one or more transmitters for transmitting swept frequency acoustic waves into the downhole formation, and one or more receivers for receiving reflected acoustic signals indicative of bed boundaries. Appropriate circuitry and processing is provided to cross-correlate the received signal and the transmitted signal to yield reflection signatures from bed boundaries and remove the effects of extraneous noise. Once the received signal and transmitted signal are correlated and processed, the lag time between transmission and reception is determined. A distance to the bed boundary is calculated from the lag time. The bed boundary distance may be transmitted to a downhole microcontroller, or to the surface, to permit the inclination of the bottomhole assembly to be changed, as desired.

To begin a cycle, a swept frequency acoustic signal burst is transmitted into the formation at periodic intervals. The swept frequency signal increases the probability that a recognizable received signal will be obtained and recovered by the receiver. The acoustic signals detected by the receiver are converted to analog electrical signals representative of the received acoustical waveform. The analog electrical signals are converted to a high precision digital signal, and provided as an input to a digital signal processor over a high speed parallel DMA port. The digital signal processor connects via a multiplexed address data bus to the downhole microprocessor. The microprocessor also connects through appropriate conditioning circuitry to the transmitter(s) for controlling the acoustic waveform generated by the transmitter.

Digital data signals representative of the transmitted acoustic wave signal are provided to the digital signal processor together with the digitized signal representative of the received acoustic wave signal. The digital signal processor cross-correlates the transmitted signal with the received signal to yield reflection signatures and remove extraneous noise. This cross-correlation may be accomplished either through time domain convolutions or through frequency domain techniques. The digital signal processor generates an output signal to the microprocessor indicative of the cross-correlation results, from which the microprocessor preferably determines a lag time between transmission and reception. The lag time may then be used to determine a distance to the bed boundary. This information can either be transmitted to the surface via a mud pulse signal, or can be used to automatically control the inclination of the bottomhole assembly to drill in the desired direction based upon the detection of the bed boundaries.

The present invention can be used to look either to the sides of the borehole, or can be used to look ahead of the bit, using either the swept frequency or short acoustic pulse techniques. The steering and collimation of the transmitter and receiver arrays is controlled by the frequency of the processed signal, the spacing between adjacent array elements, the delay time between activating adjacent elements, the aperture (the maximum distance between any two array elements), and the acoustic wavelength. The lower the transmission frequency, the less the transmitted signal is attenuated. Thus, in situations where the steering and collimation of the tool is toward the sides of the borehole, such as during a horizontal segment of the well, a frequency of approximately 12 kHz might be used to provide reflections to a depth of approximately 10 feet on either side of the borehole, with an expected error of one foot. Conversely, if the steering and collimation is well ahead of the bit, the transmission frequency might be on the order of 500 Hz, to provide acoustic reflections to a depth of a hundred feet or more, with an error of approximately 10%. With respect to receiver spacing, the aperture of the receiver array preferably is selected to be at least one wavelength of the acoustic wave at the transmitted frequency. To increase the steering resolution and collimation distance, the receiver aperture is increased. Thus, for steering and collimation ahead of the bit, a receiver aperture of five times the acoustic wavelength may be used to enable better steering of the acoustic wave.

In addition to the distance calculations and dip angle values determined from the above techniques, the present invention and the various embodiments discussed herein can also be used to obtain information about characteristics of the formation beyond the boundary from the amplitude and phase of the reflected acoustic signals.

BRIEF DESCRIPTION OF THE DRAWINGS

For a more detailed description of the preferred embodiment of the present invention, reference will now be made to the accompanying drawings, wherein:

FIGS. 4A–4C are exemplary signal diagrams illustrating transmitted, received and cross-correlated signals in the swept frequency embodiment;

FIG. 9 is a cross-sectional view of an acoustic logging tool showing a receiver array configured in accordance with yet another embodiment of the present invention;

FIGS. 10A–10B are exemplary flow charts illustrating methods by which geo-steering can be implemented using the present invention;

During the course of the following description, the terms "above" and "below" are used to denote the relative position of certain components with respect to the direction of flow of the incoming drilling mud. Thus, where a term is described as above another, it is intended to mean that drilling mud flows first through the first component before flowing through the second component. Thus, these and other terms are used to identify the relative position of components in the bottomhole assembly, with respect to the distance to the surface of the well, measured along the wellbore path.

DETAILED DESCRIPTION OF THE PREFERRED EMBODIMENT

Figure 1:
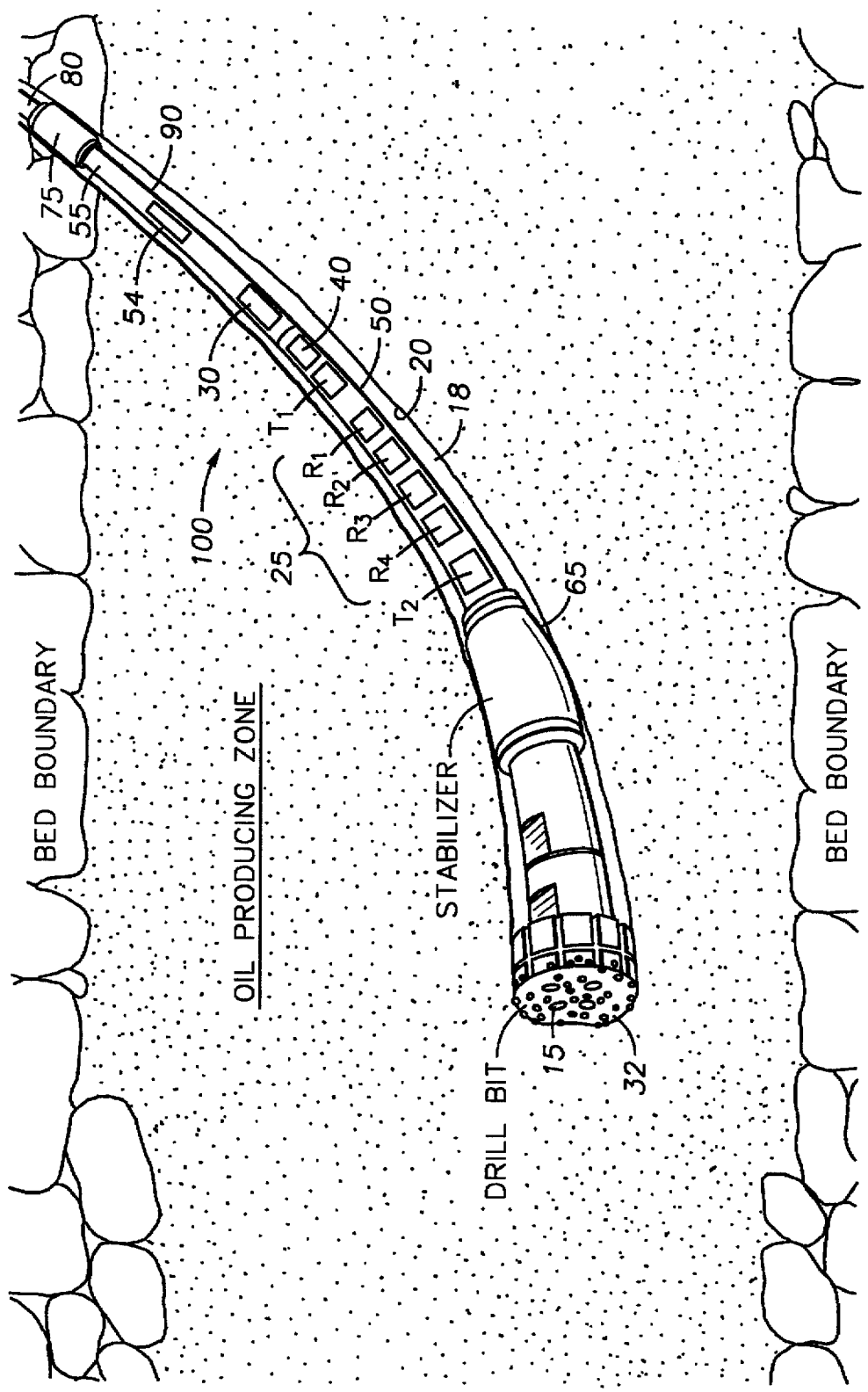
FIG. 1 is a schematic illustration of a drilling assembly implementing an acoustic logging tool for determining bed boundaries as part of a logging while drilling (or "LWD") system in accordance with the preferred embodiment of the present invention.

Referring now to FIG. 1, a bottomhole drilling assembly (or BHA) 100 is shown constructed in accordance with the preferred embodiment. As shown in FIG. 1, the bottomhole drilling assembly 100 is positioned in an oil-producing zone, or "pay zone," but is approaching a bed boundary. If the bottomhole assembly 100 continues drilling at the same inclination, it will exit the pay zone. The present invention discloses a system to detect such bed boundaries, and make appropriate course corrections to stay within the pay zone. Alternatively, the present invention can be used to detect the boundary of a pay zone, so that the path of the bottomhole assembly 100 is selected to enter the pay zone. In particular, the present invention is useful in determining the distance to bed boundaries, the dip angle of boundaries with respect to the borehole, and the location of the bed boundary with respect to the borehole. The present invention may also provide useful information regarding the characteristics of the bed. This feature has many potential advantages, including enabling the driller to prepare for drilling into a dangerous high pressure formation.

Referring still to FIG. 1, the bottomhole drilling assembly, 100 preferably includes a drill bit 32 for drilling a wellbore 20, an LWD tool 50 including acoustic transmitters $T_1$ and $T_2$ and a receiver array 25 (with receivers $R_1$ to $R_4$), one or more stabilizers 65, 75, a mud pulser collar 90, and a section of drill collar 80 or other conventional downhole components. Other logging sensors may be used in conjunction with the acoustic transmitters and the receiver array 25, as will be understood by one skilled in the art. For example, it is preferred that directional sensors 40 be provided in the logging tool 50, or elsewhere in the bottomhole assembly 100 to provide an indication of inclination angle of the BHA 100, the azimuth of the BHA, and the tool face angle.

For purposes of illustration, the directional sensors 40 are shown in FIG. 1 in the upper portion of the LWD tool 50. In accordance with known techniques, wellbore directional measurements can be made as follows: a three axis accelerometer measures the earth's gravitational field vector, relative to the tool axis and a point along the circumference of the tool called the tool face scribe line. From this measurement, the inclination of the bottomhole assembly can be determined to provide an indication of the deviation of the wellbore with respect to vertical. The three axis accelerometer also provides a measure of "tool face angle," which is the orientation (rotational about the tool axis) angle between the scribe line and the high side of the wellbore. Additionally, a three axis magnetometer measures the earth's magnetic field vector in a similar manner. From the combined magnetometer and accelerometer data, the azimuth and magnetic tool face angle of the tool may be determined. As one skilled in the art will understand, azimuth is the horizontally projected direction of the wellbore relative to North.

The BHA 100 also preferably includes a downhole controller unit 30, which orchestrates the operation of the various downhole sensors. As will be described in more detail below, the downhole controller 30 also provides processing capabilities downhole to permit the sensed data to be processed in a real-time environment, and to permit the processed data to be available during the drilling process. For purposes of illustration, the downhole controller 30 is shown in FIG. 1 in the lower portion of the mud pulser collar 90. As one skilled in the art will realize, the downhole controller could be located in any convenient location in the BHA, including the acoustic logging tool 50.

A drill string (not shown) connects the bottomhole assembly 100 to the surface drilling equipment in accordance with conventional techniques. The drill bit, stabilizers, mud pulser collar and drill collars preferably comprise components that are known in the drilling industry. Thus, these components will not be described in detail herein, except as they particularly relate to the present invention.

The bottomhole drilling assembly 100 may include a downhole motor for operating the drill bit 32 in accordance with conventional techniques, and/or the drill bit may be operated by rotating the entire drillstring 55 from the surface of the well. Drilling mud preferably is forced through the interior of the drillstring, and through the interior of the bottomhole drilling assembly. The drilling mud exits from the nozzles 15 in the bit 32 and functions to cool and lubricate the bit and to remove earth cuttings and carry the cuttings to the surface along the annulus 18 of the wellbore 20. The drilling mud also serves as a communication medium between telemetry and control units 54 in the mud pulser collar 90 and components at the surface of the well. By altering the flow of the drilling mud through the interior of the drill string, pressure pulses may be generated, in the form of acoustic signals, in the column of drilling fluid. By selectively varying the pressure pulses through the use of a mud pulser in the mud pulser collar 90, encoded binary pressure pulse signals can be generated to carry information indicative of downhole parameters to the surface for immediate analysis.

The stabilizers 65, 75 preferably are adjustable in accordance with the disclosure in commonly assigned U.S. Pat. Nos. 5,318,137 and 5,318,138, the teachings of which are incorporated by reference as if fully set forth herein. As disclosed in these inventions, the inclination of the bottomhole assembly can be changed by selectively varying the diameter of the stabilizer blades. As one skilled in the art will immediately recognize, the course of the bottomhole assembly 100 also can be changed in accordance with other techniques, such as by selectively turning on or off a downhole motor, adjusting the angle of bend in a bent motor housing, or changing the weight on bit of the system.

The LWD tool 50 preferably is located close to the drill bit 32 to facilitate the ability to examine the formation as close to the bit as possible. As one skilled in the art will understand, the LWD tool 50 could also be located further up the bottomhole assembly 100 from the drill bit 32, without departing from the principles of the present invention. Moreover, and as discussed more fully with respect to FIG. 14, the LWD tool 50 may in actuality comprise multiple collar sections to increase the distance or aperture between the upper receiver and lower receiver. As the aperture of the receiver array increases, so too does the steering capabilities of the acoustic waves from the tool. The steering capabilities of the tool are controlled by the ratio of the aperture to the wavelength ($\lambda$) of the acoustic wave. As the ratio increases, so too does the steering capabilities of the tool 50. Thus, by increasing the distance between the end-most receivers in the tool 50, the ability to steer and collimate the acoustic tool in a particular direction is enhanced. This concept becomes increasingly important as the depth of investigation of the acoustic logging tool 50 increases.

Correspondingly, the attenuation of the acoustic wave increases with the frequency f of the acoustic wave. Thus, the higher the acoustic frequency, the greater is the attenuation. To increase the depth of investigation of the tool, it is necessary to decrease the transmitted acoustic wave frequency (which conversely increases the wavelength). Because of these competing criterion, the present invention envisions a transmission frequency of 5 kHz–20 kHz for investigation of the formation surrounding the borehole, and 100 Hz–1000 Hz for investigation of the formation ahead of the borehole. With either type of investigation, a receiver spacing of $1(\lambda)$–$5(\lambda)$ is preferred.

FIG. 1 depicts two transmitters $T_1$ and $T_2$ and a receiver array 25 comprising four receivers, $R_1$, $R_2$, $R_3$, $R_4$. The transmitters may be fired individually with all steering performed by the receiver array. Alternatively, each of the transmitters $T_1$ and $T_2$ may comprise a sparse (two element array) having an aperture defined by the spacing between the two transmitters. The invention can, alternatively be constructed with additional or fewer transmitters, or with additional or fewer receivers, as desired. Similarly, instead of the axial alignment shown in FIG. 1, many other transmitter and receiver alignments can be used, some of which will be set forth in the description which follows. In what is presently perceived as the preferred embodiment in a horizontal well segment, the transmitters generate a short acoustic pulse, with a central frequency band in the range of 5–20 kHz to focus on formations lateral to the borehole, with a frequency of approximately 12 kHz considered optimal. Alternatively, a swept frequency signal may be used instead of the short acoustic pulse signal.

As shown in FIG. 1, the transmitters and receivers preferably are aligned axially along the outer wall of logging tool 50. In the preferred embodiment (assuming a transmission frequency of approximately 12 kHz ), the transmitter $T_1$ and receiver $R_1$ are spaced apart a distance of approximately four feet. Each of the receivers preferably are spaced a foot apart, and receiver $R_4$ and transmitter $T_2$ are spaced four feet apart. Other spacings may be used, as desired, as the transmission frequency is modified for the particular circumstances. As one skilled in the art will understand, the spacings are largely determined by the transmission frequency of the transmitters. By spacing the receiver array 25 as shown in FIG. 1, a substantial aperture is produced in the axial/radial plane, enabling the acoustic signals to be steered with a relatively high degree of resolution in an axial/radial direction. The aperture in the radial/azimuthal plane is less than a wavelength for frequencies below 5 kHz giving poor resolution of bed boundary azimuth at low frequencies. Other spacings and transmission frequencies could be used to project the acoustic beam further with increased steering capabilities as required to look ahead of the drill bit. A small radial/azimuthal aperture does not adversely affect the steering and collimation of an end fire array propagating signals in the axial direction. For bed boundaries perpendicular to the tool axis, all azimuthal directions have identical returns.

In the preferred embodiment as contemplated by the inventors, the LWD logging tool 50 can comprise a conventional acoustic logging device that determines the formation speed of sound, to provide valuable insight into the characteristics of the formation in the region of the borehole. In accordance with the present invention, that same acoustic logging tool preferably also is used to determine information regarding the adjacent bed boundaries, including the distance from the borehole to the boundary, the dip angle of the boundary, the direction of the boundary, and at least to some extent, the characteristics of the boundary. Alternatively, the acoustic logging tool 50 may be designed to only determine information about adjacent bed boundaries, without speed of sound determinations.

Figure 3A:
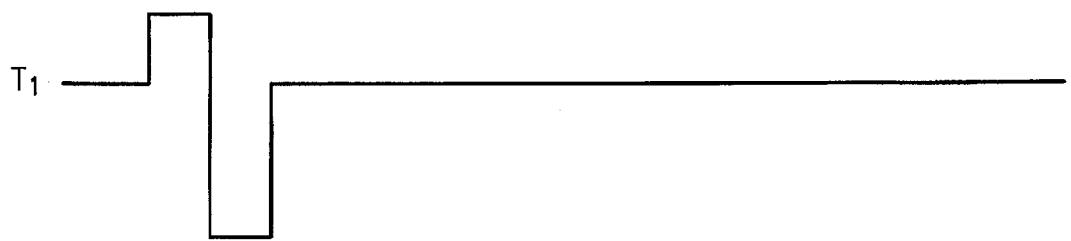
FIGS. 3A–3E are exemplary signal diagrams illustrating signals transmitted and received in the short pulse system embodiment.
Figure 3B:
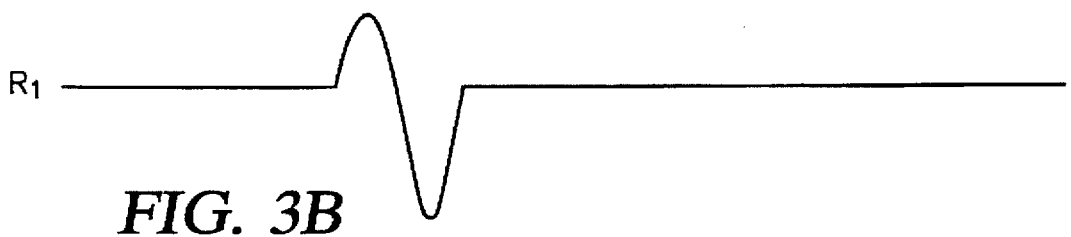
Figure 3C:
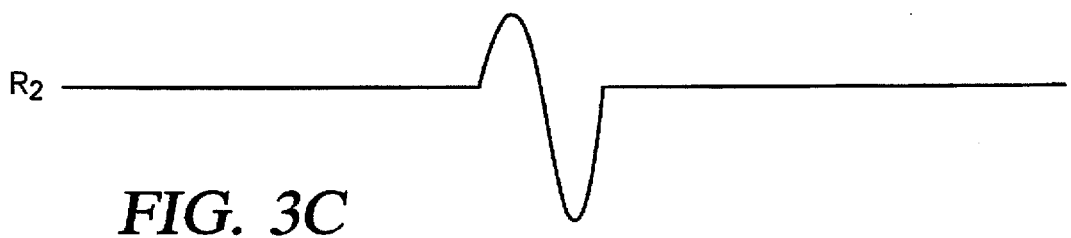
Figure 3D:
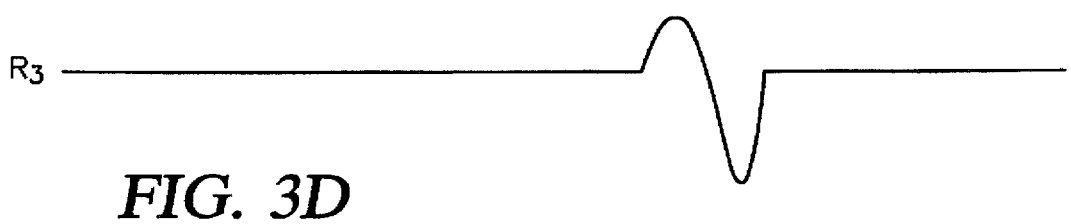
Figure 3E:

As will be disclosed in more detail below, the acoustic transmitter can fire either a short acoustic pulse, or can generate a swept frequency signal. Thus, as shown in FIG. 3A, a short acoustic pulse may be transmitted into the formation by transmitter $T_1$. The electrical pulse may form a square wave signal, but other wave shapes, such as a more sinusoidal shaped wave, are acceptable. The short pulse preferably has a duration of between 50–100 microseconds. Thus, for example, if a 12 kHz signal is used, the period of the acoustic pulse is 83 microseconds. The pulse preferably has a positive amplitude of x, and a negative amplitude of 2x. Thus, for example, if the amplitude of the positive portion of the pulse is approximately 500 volts, the amplitude of the negative portion of the pulse is approximately 1000 volts. As one skilled in the art will understand, however, other wave forms and amplitudes could be used if desired to focus on particular formations to recover and correlate the signals reflected by the bed boundaries.

Figure 2A:
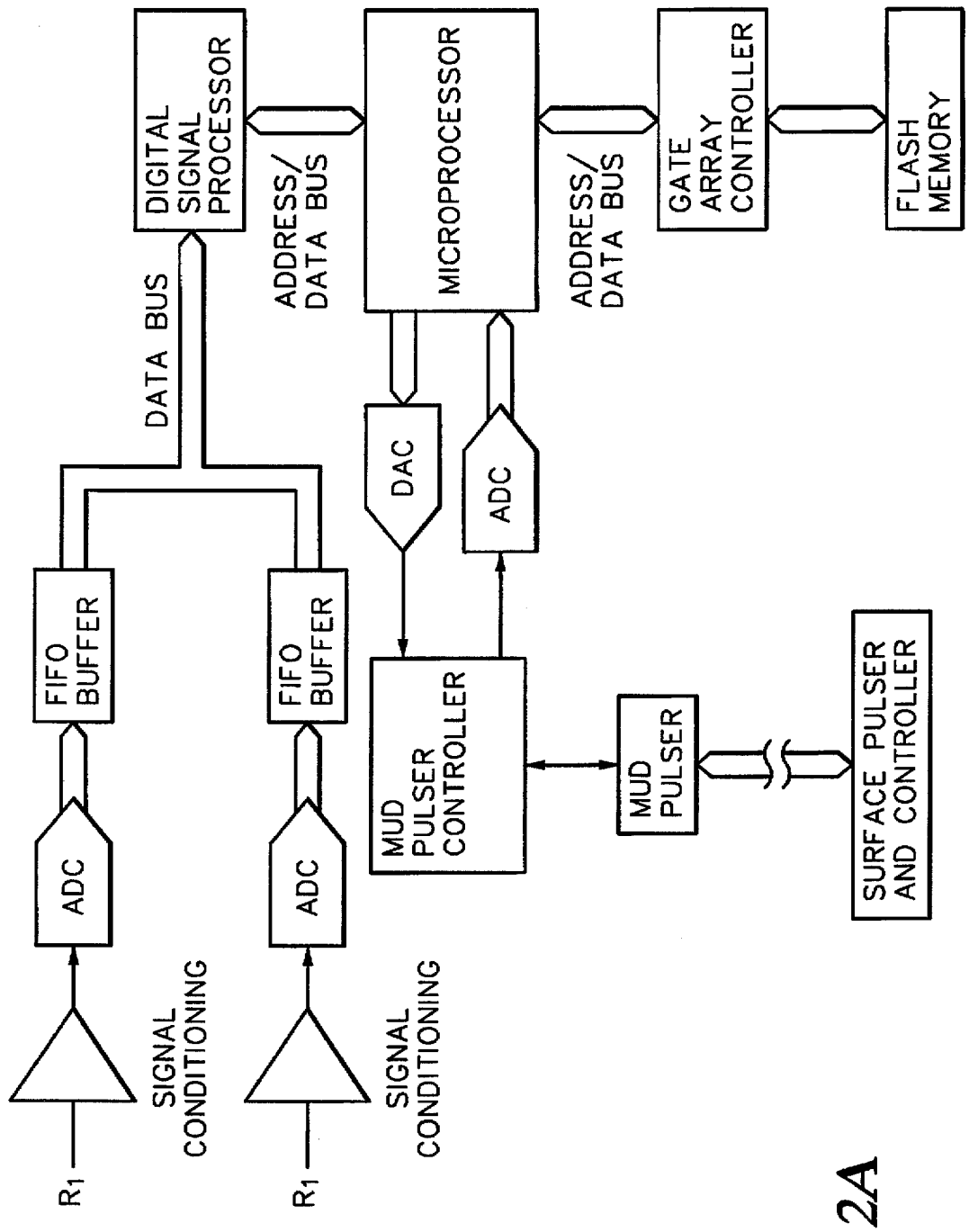
FIG. 2A is a functional block diagram of the LWD system of FIG. 1, constructed for use with short acoustic pulse transmission.

FIGS. 3B–3E show the idealized acoustic wave signal received by receivers $R_1$, $R_2$, $R_3$ and $R_4$ after the transmitted signal is reflected from the boundary. As one skilled in the art will realize, these signals comprise signals that have been smoothed and filtered to eliminate noise. The circuitry used in the preferred embodiment to generate the transmitted signals and to smooth and process the received signals is shown in FIG. 2A. Referring now to FIG. 2A, the electronics for the LWD tool 50 in the short acoustic pulse embodiment includes receivers (only two are shown in FIG. 2A as $R_1$, $R_2$ to simplify the drawing), signal conditioning and processing circuitry 95, a digital signal processor (or DSP) 165, a downhole microprocessor (or microcontroller) 150, a downhole memory device 175, a mud pulser controller 180, and one or more transmitters (only one is shown, $T_x$, to simplify the drawing).

In the preferred embodiment, where multiple receivers are implemented, multiple signal paths are required to the DSP 165. If (as in the preferred embodiment), additional receivers are used, additional signal paths must be provided. Receivers $R_1$ and $R_2$ receive acoustic signals from the formation and in response produce an electrical analog signal. The electrical analog signals preferably are conditioned by appropriate signal conditioning circuitry 91. As one skilled in the art will understand, the signal conditioning circuitry 91 may include impedance buffers, filters, gain control elements, or other suitable circuitry to properly condition the received analog signal for processing by other circuit components. In the preferred embodiment, the conditioning circuitry includes a filter for excluding lower frequency noise that is present during drilling.

The conditioned signal is applied to an analog-to-digital (A/D) converter 120 to convert the analog signal to a digital signal. To maintain an appropriate degree of accuracy, the A/D converter 120 preferably has a resolution of at least 12 bits. The digital output signal from the A/D converters 120 are applied to FIFO (first in, first out buffers 130. The FIFO buffers 130 preferably function as a memory device to receive the asynchronous signals from the receivers, accumulate those signals, and transmit the signals to the digital signal processor 165 at a desired data rate to facilitate operation of the digital signal processor. The FIFO buffers 130 preferably have a capacity of at least 1 kbyte. The data from the FIFO buffers 130 is transmitted over a high speed parallel DMA port 140, which has a preferred width of at least 16 bits. Thus, the signal conditioning and processing circuitry 95 takes the analog signal from the receivers and produces a high precision digital signal representative of the received acoustic signal to the digital signal processor 165.

The digital signal processor (DSP) 165 preferably comprises a 32-bit floating point processor. As shown in FIG. 2A, the DSP 165 receives the digitized representation of the received acoustic signals over the 16-bit data bus 140. The DSP 165 also connects to the microprocessor (or microcontroller) 150 via a multiplexed address/data bus 155, and also preferably connects to the output of the one shot multivibrators 198, 199 for receiving digital signals indicative of the acoustic signal to be transmitted by transmitter $T_1$. In accordance with the preferred embodiment of the present invention, the DSP 165 performs computations and processing of data signals and provides the results of these computations to the microprocessor 150.

The microprocessor 150 preferably comprises a full 16-bit processor, capable of withstanding the high temperature downhole. As noted above, the microprocessor 150 preferably connects to the digital signal processor 165 through a 16-bit multiplexed address/data bus 155. The microprocessor 150 also connects through a multiplexed address/data bus 160 to a memory array 175, which is controlled by a gate array controller 265. The microprocessor 150 preferably provides output signals to the mud pulser controller 180 on data bus 225 for transmission to the surface via mud pulse signals modulated on the column of drilling mud 205. The digital output signals on data bus 225 are provided to a digital-to-analog (D/A) converter 235, where the signals are converted to serial analog signals. In the preferred embodiment, the microprocessor 150 also receives signals from the mud pulser controller 180 through an analog-to-digital converter 245. In this manner, the microprocessor 150 also can receive operating instructions from a controller 250 at the surface.

The microprocessor 150 controls the generation of the acoustic signal transmitted by the transmitter $T_x$. The microprocessor 150 provides an output signal to a one shot multivibrator 198, which generates a positive output pulse of a defined duration. The output pulse from the multivibrator 198 is amplified by a high power buffer 278, to produce the positive portion of the short acoustic pulse waveform. As shown in the exemplary embodiment of FIG. 2A, the multivibrator 198 produces an output signal that is provided to the DSP 165 to indicate the time during which the transmitter fired. The output signal from multivibrator 198 also may be used to trigger a second one shot multivibrator 199, or alternatively, the second multivibrator may be triggered by the microprocessor 150, or DSP 165.

The second multivibrator 199 preferably is triggered on a falling edge, causing the second multivibrator to trigger at the end of the positive pulse generated by the first multivibrator 198. The second multivibrator 199 also produces a negative going pulse in accordance with the exemplary transmission signal shown in FIG. 3A. The output of multivibrator 199 connects to a high power amplifier 279, which preferably generates an output signal with a magnitude that is twice as much as the output signal generated by amplifier 278.

While an exemplary embodiment has been shown and described for the electronic logging circuitry to implement a short acoustic pulse transmission, one skilled in the art will understand that the electronic circuitry could be designed in many other ways, without departing from the principles disclosed herein.

Figure 2B:
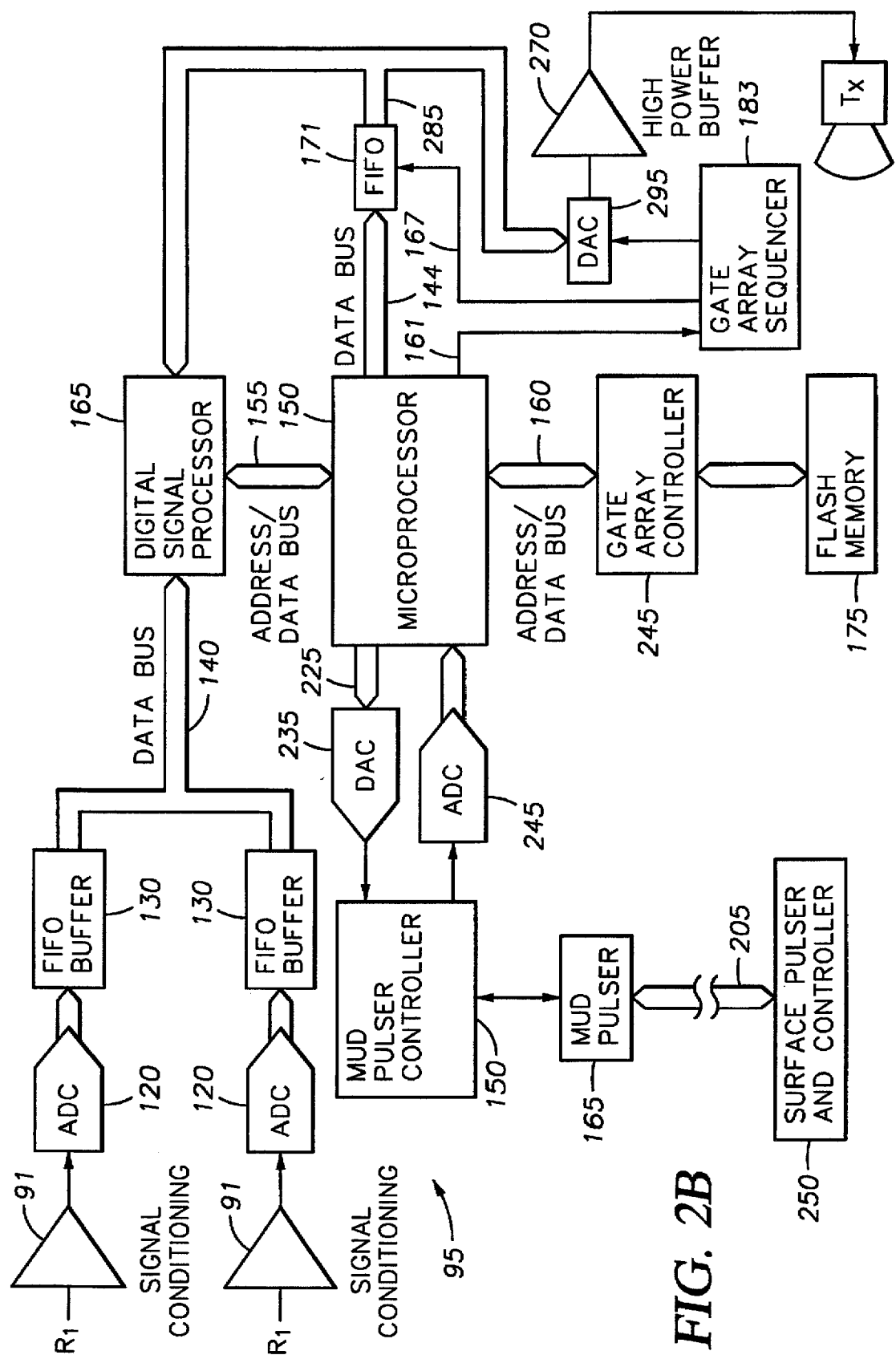
FIG. 2B is a functional block diagram of the LWD system of FIG. 1, constructed for use with a swept frequency acoustic transmission.

Referring now to FIG. 2B, exemplary circuitry for implementing the swept frequency transmission embodiment is shown. In FIG. 2B, similar reference numbers as those shown in FIG. 2A have been used to denote similar components. A comparison of FIGS. 2A and 2B reveals that the primary difference relates to the circuitry associated with the generation of the transmission signal. Referring to FIG. 2B, the microprocessor 150 provides the desired transmission signal in digital form to a FIFO buffer 171 via data bus 144. The microcontroller 150 also provides a control signal on line 161 to a gate army sequencer 183, which controls the transmission of the transmission signal out of the FIFO buffer 171 through a control signal on line 167.

When the FIFO buffer 171 receives the control signal from the gate array sequencer 183, and after the digital transmission signal has been received and accumulated by the FIFO buffer 171, the FIFO buffer 171 drives out the digital transmission signal at a fixed rate on data bus 285, where it is received at a digital-to-analog (D/A) converter 295 and converted to an analog signal. The output of the D/A converter 295 then is applied to a high power buffer 270 to convert the signal to a high power signal to drive transmitter $T_x$. In the exemplary embodiment of FIG. 2B, the output of FIFO buffer 171 also is applied to the digital signal processor 165. As one skilled in the art will understand, however the digital transmission signal alternatively could be applied to the DSP 165 from the microcontroller 150 over the multiplexed address/data bus 155.

In both the embodiments of FIG. 2A and 2B, the downhole memory device 175 preferably comprises an array of flash memory units. In the preferred embodiment, each of the flash memory devices has a storage capacity of 4 Mbytes, and an array of 9 flash memory devices are provided to provide a total storage capacity of 36 Mbytes. More or less memory may be provided as required for the particular application. In the preferred embodiment, the DSP 165 and microcontroller 150 provide real-time analysis of the received acoustic wave to permit real-time decisions regarding the drilling operation. The entire digitized waveform, however, is stored in the downhole memory 175 for subsequent retrieval when the bottomhole drilling assembly is pulled from the well. Data is written to the memory 175 through a gate array controller 265 in accordance with conventional techniques.

Referring now to FIGS. 2A and 2B, the mud pulser unit 185 permits acoustic mud pulse signals to be transmitted through the column of drilling mud 205 to the surface controller 250 during the drilling of the wellbore. The mud pulser unit 185 preferably includes an associated controller 180 for receiving analog signals from the D/A converter 235 and actuating the mud pulser 185 in response. In addition, in the preferred embodiment, the mud pulser 185 includes a transducer for detecting mud pulses from the surface controller 250. The output of the transducer preferably connects to the controller 180, which decodes the signals and produces an output signal to the microprocessor 150 through analog-to-digital converter 245.

The transmitter unit and receiver units preferably comprise acoustic transducers for generating and detecting acoustic signals. In accordance with conventional techniques, the transducer may be constructed of magnetostrictive rods (see U.S. Pat. No. 4,869,349), piezoelectric elements (see U.S. Pat. Nos. 4,649,525, 4,782,910, 5,069, 308), barium titanate (see U.S. Pat. No. 3,593,255), or electromagnetic shaker drivers or pistons driven by compressed fluids. In the preferred embodiment, the transducers operate in a linear mode.

Figure 5A:
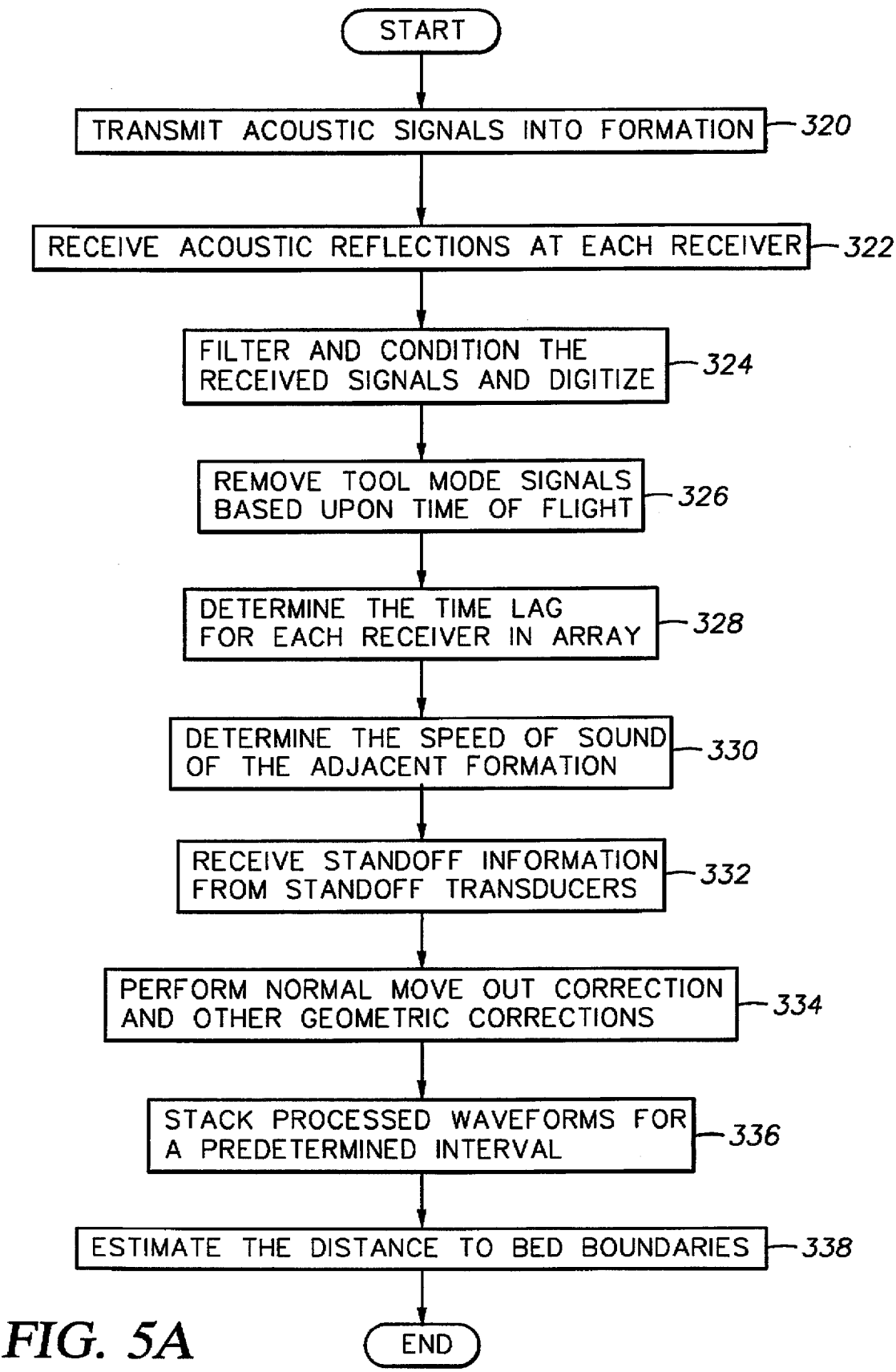
FIG. 5A is an operation flow chart illustrating the manner in which the microprocessor of FIG. 2A performs a bed boundary distance determination.

Referring now to FIGS. 2A and 5A, the operation of the short acoustic pulse embodiment will now be described for the logging tool shown in FIG. 1. The microprocessor 150 initiates transmission of the acoustic signal (step 320 in FIG. 5A) by generating a digital representation of the desired signal. In the preferred embodiment, the microprocessor generates a digital signal that is applied to a first one shot multivibrator 198, causing the multivibrator to generate a generally square waved pulse with a predetermined duration. The output of the multivibrator 198 is amplified by buffer 278 and applied to the transmitter, causing it to fire. The output of the multivibrator 198 also is provided to a second one shot multivibrator, causing it to fire on the falling edge of the output signal. The output of the second multivibrator 199 is amplified by a second buffer 279, causing the transmitter to continue firing with a negative amplitude. As a result of this operation, the transmitter generates a short acoustic pulse transmission signal as shown in FIG. 3A, with a preferred frequency of 12 kHz.

In step 322 of FIG. 5A, the reflected signals begin to be received at the receivers $R_1$, $R_2$, $R_3$, $R_4$, as shown in FIGS. 3B–3E. The receivers produce an analog electrical signal that is conditioned and digitized by the signal conditioning circuitry 91 and A/D converters 120 (step 324). The digitized signals are loaded into the FIFO buffers 130, and transmitted at a uniform rate to the DSP 165 on the high speed data bus 140. The DSP 165 also receives signals indicative of the transmission signal, preferably from the outputs of the multivibrators 198, 199, to insure proper timing of the transmission and received signals. The DSP 165 uses the timing of the transmission signals to determine transit time of the acoustic signals and to reject early arriving signals caused by acoustic waves travelling along the acoustic tool 50 itself. The phenomena of acoustic wave propagation through the tool is known as the "tool mode." The tool mode signals are rejected, as shown in step 326.

In step 328 the DSP 165 processes the transit times $\Delta t_{fi}$ between transmission of the acoustic signal by either transmitter $T_1$, $T_2$, and the receipt of the signal by each of the receivers $R_1$, $R_2$, $R_3$, $R_4$. After the transit times $\Delta t_{fi}$ are determined, the DSP 165 uses this information to calculate the speed of sound v in the formation, in accordance with known techniques.

Once the transit time $\Delta t_{fi}$ and formation velocity v are known, the distance to the bed boundary can be approximately determined as follows:

$$d = \frac{v \times \Delta t_{bi}}{2} \qquad (1)$$

where $\Delta t_{bi}$ is the travel time for a reflection from a bed boundary.

Figure 7:
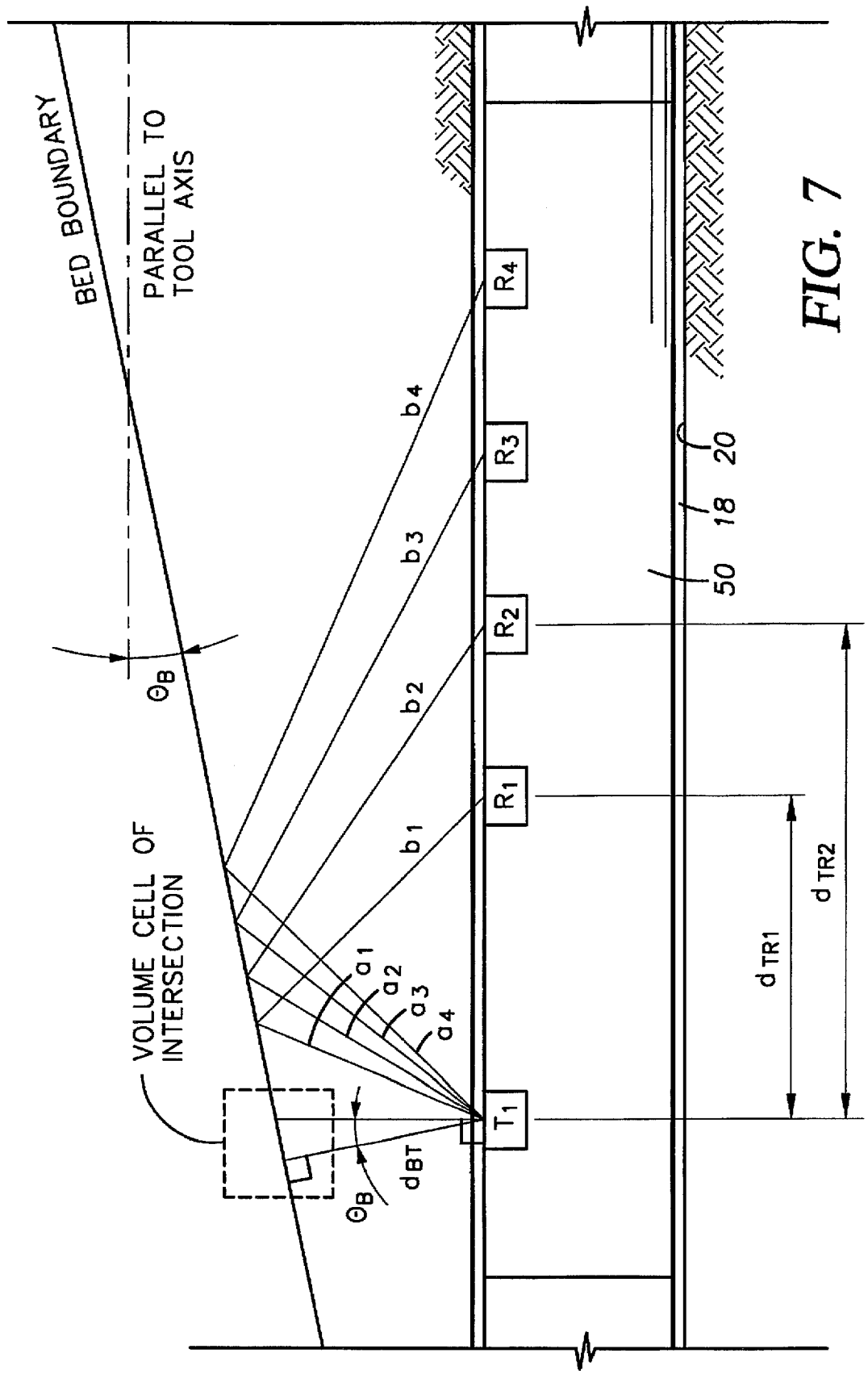
FIG. 7 is an illustration of signal reflections received by the receiver arrays depicting the timing delay caused by the geometric path of the acoustic waves.

The product of the time and velocity are divided by two to account for the fact that the acoustic wave must travel to and from the boundary, as illustrated in FIG. 7. In addition, as shown in FIG. 7, the distance calculation only represents a rough approximation, due to the fact that the reflected acoustic wave does not travel in a direction that is exactly perpendicular to the tool 50. Instead, the acoustic waves detected at each of the receivers travel along different paths from the transmitter. As a result, the acoustic wave received at receiver $R_1$ travels a shorter distance than the acoustic wave received at receiver $R_4$, as shown in both FIGS. 3A–3E, and in FIG. 7. Because of the geometric effects shown in FIG. 7, transit times of the arrivals from receivers $R_1$ to $R_4$ vary in a nonlinear manner. The present invention preferably performs a geometric correction to sum the time delayed data from all receivers. The time delays for summing are calculated to maximize the summed amplitude of the reflected signals for each volume cell (voxel) of investigation. The maximum summed amplitude occurs when the reflected signals from all receivers are coincident because of the calculated delays.

Thus, as shown in FIG. 7, a bed boundary is shown diverging away from the borehole axis at a directed angle $\theta_B$. This configuration is discussed by Morris Miller Slotnick in "Lessons in Seismic Computing" published by the Society of Exploratin Geophysicists, pp 48–53, (1959). The shortest path between the bed boundary and transmitter $T_1$ is defined by a line that is normal to the bed boundary. The distance of this line is shown in FIG. 7 as $d_{BT}$. The distance between transmitter $T_1$ and $R_1$ is shown as $d_{TR1}$, and the distance between transmitter $T_1$ and $R_2$ is shown as $d_{TR2}$ (the other receivers are ignored here to simplify the discussion with the understanding that the following methodology would be applied to the signals received by the other receivers in a similar fashion). The path (path 1) of the boundary reflected acoustic signal between $T_1$ and $R_1$ is the sum of path segments $a_1$ and $b_1$ (path $1=a_1+b_1$). Similarly, the path (path 2) of the boundary reflected acoustic signal between $T_1$ and $R_2$ is the sum of path segments $a_2$ and $b_2$ (path $2=a_2+b_2$). In an exemplary embodiment of the invention, the distances $d_{BT}$ and directed angles $\theta_B$ are varied or "steered" to investigate each volume cell (or "voxel") for which transmitter $T_1$ can reflect signals to the receivers. In the preferred embodiment, each volume cell surrounding the borehole is investigated for a unique bed boundary that is perpendicular to a line formed between the volume cell and the transmitter.

By performing a trigonometric analysis, the path distances can be expressed as follows:

$$\text{Path1} = a_1 + b_1 = 2d_{BT}\sqrt{1 + \frac{d_{TR1}}{d_{BT}}\sin\theta_B + \left(\frac{d_{TR1}}{2d_{BT}}\right)^2} \quad (2)$$

$$\text{Path2} = a_2 + b_2 = 2d_{BT}\sqrt{1 - \frac{d_{TR2}}{d_{BT}}\sin\theta_B + \left(\frac{d_{TR2}}{2d_{BT}}\right)^2} \quad (3)$$

To determine the distance and orientation of the bed boundary, the receivers are steered to investigate the depths dbt and angles $\theta_B$ of the surrounding voxels. Thus, for example, if $d_{BT}$ is chosen as 6 feet, and $\theta_B$ is chosen as 30°, these values are inserted into the equations (2) and (3) above to obtain the path distances (path 1 and path 2). The path distances then are used to determine the desired $\Delta t$ for delaying the signals received at $R_1$, as follows:

$$\Delta t = \left(\frac{\text{Path2} - \text{Path1}}{v}\right) = 2\frac{d_{BT}}{v}\left[\sqrt{1 - \frac{d_{TR2}}{d_{BT}}\sin\theta_B + \left(\frac{d_{TR2}}{2d_{BT}}\right)^2} - \sqrt{1 - \frac{d_{TR1}}{d_{BT}}\sin\theta_B + \left(\frac{d_{TR1}}{2d_{BT}}\right)^2}\right] \quad (4)$$

In operation, and referring still to FIG. 7, the transmitter $T_1$ is fired and acoustic waveforms are received at the receivers. Considering only the first two receivers for the sake of simplicity, the waveform received at $R_1$ is delayed by the delay time $\Delta t$, before it is summed with the waveform received at $R_2$ to obtain a total received waveform $R_{TOTAL} = R_1$ (delayed by $\Delta t$)+$R_2$. The amount of delay ($\Delta t$) is determined by equation (4), after selecting values for $d_{BT}$ and $\theta_B$, which are used in equations (2) and (3) respectively to obtain the path distances of the volume cell being investigated.

This procedure is repeated until all volume cells have been investigated. At that time, the summed received waveforms ($R_{TOTAL}$) are compared for all volume cells. The volume cell having the maximum sum $R_{TOTAL}$ (with correction for attenuation and beam spread) is selected as indicating that the bed boundary is perpendicular to the line $d_{BT}$ and at an angle $\theta_B$ with respect to a line parallel to the tool axis. In addition, the maximum sum can be compared with a threshold value to insure a bed boundary has been detected. Using the amount of delay ($\Delta t$) for that maximum summed waveform gives the path distances, which can then be used to determine the transit time $t$, of the reflected signal by:

$$t = \frac{\text{Path2}}{v} \quad (5)$$

Hence, any bed boundary has a unique $d_{BT}$ and is therefore uniquely described by giving the $d_{BT}$, $\theta_B$, the transit time and the delay time for the voxel containing the intersection of $d_{BT}$.

A bed boundary, indicated by the maximum $R_{TOTAL}$ values, preferably are tracked with depth. Thus, as the bottom hole assembly penetrates the underground formations, the maximum $R_{TOTAL}$ values and related information ($d_{BT}$, $\theta_B$, etc.) are determined and then compared for different depths to track boundaries. Any discrepancy of bed boundary distance can be eliminated through the use of these comparative tracking techniques. The accuracy of $R_{TOTAL}$, and hence the bed boundary location, is increased with an increase in the number of receivers. Receiver arrays may eliminate certain undesirable wave arrivals such as, tube waves, standby waves and other interface waves. A large number of receivers are commonly used for surface seismic explorations for the same reasons. This method of measuring and tracking bed boundaries is a crude migration method that is very commonly used for seismic processing and thus will not be discussed herein in further detail.

Figure 8:
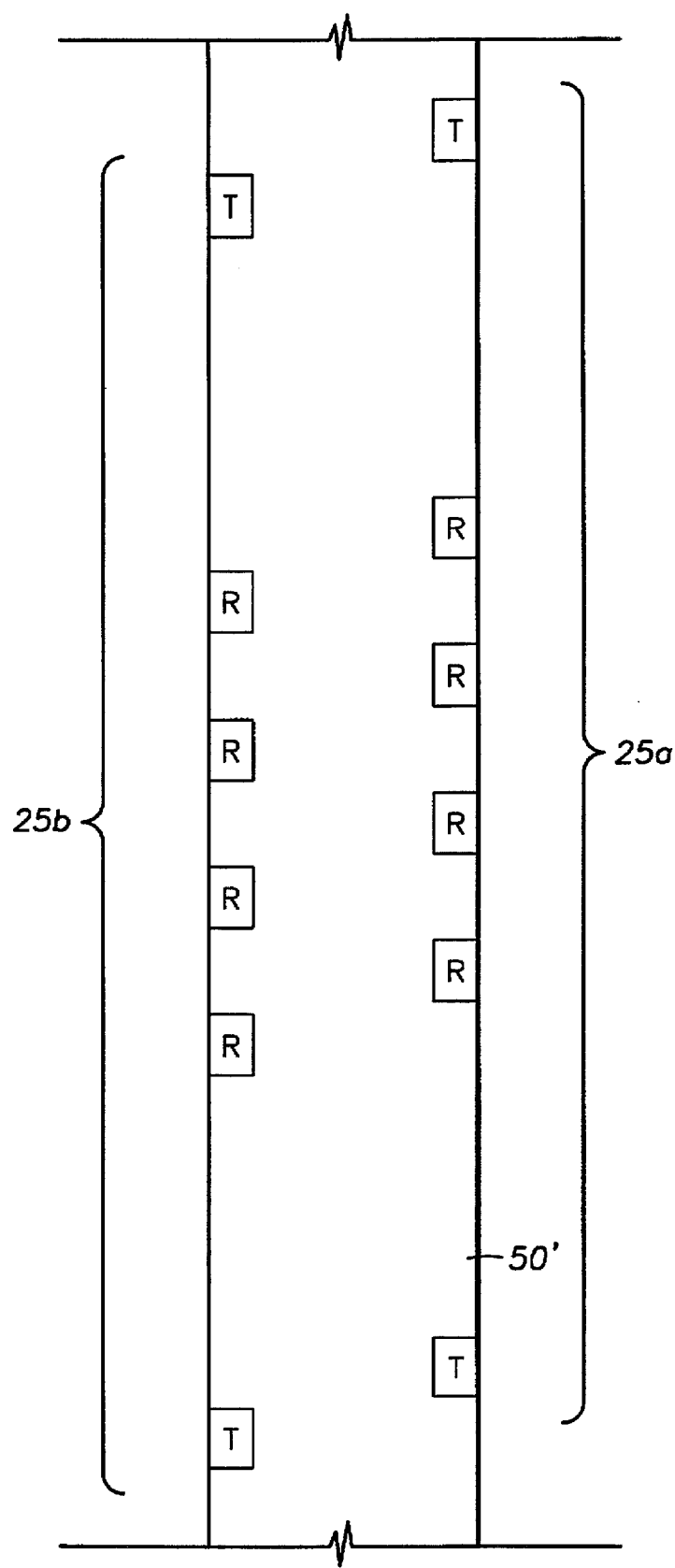
FIG. 8 depicts an alternative embodiment to the logging tool of FIG. 1, in which multiple transmitter/receiver arrays are positioned on the exterior of the tool to more precisely define the azimuthal direction of a bed boundary relative to tool radius.

In the preferred embodiment, a standoff transducer 10 is provided in the logging tool as shown in FIG. 1. The standoff transducer measures the distance between the exterior wall of the tool 50, and the borehole wall. Additional details regarding the standoff transducer are provided in commonly assigned U.S. application Ser. No. 08/430,822, the teachings of which are incorporated herein by reference. Referring again to FIG. 5A, the standoff information is received by the downhole controller 150 in step 332 and used to perform the normal move out of the logging tool in step 334. In addition, in step 334 the geometric effects depicted in FIGS. 7 and 8 are corrected. After the received acoustic waves have been processed and normalized, the waveforms from each of the receivers made during a particular interval are stacked or averaged in step 336, to produce a single waveform for the interval. From this single stacked waveform, the distance to the bed boundary can be estimated (step 338).

As an alternative to the short acoustic pulse, a swept frequency signal can be transmitted by the transmitter(s) in the acoustic logging tool 50. In this embodiment, the transmitters $T_1$, $T_2$ generate a relatively long acoustic signal with a frequency that varies. Thus, as shown in the illustration of FIG. 4A, the frequency begins at a relatively low frequency and increases to a relatively high frequency. For example, where the tool is maximized for boundaries surrounding the borehole, the frequency range may vary from 5 kHz to 20 kHz. A depiction of the actual received signal is shown by one of the receivers is shown in FIG. 4B, for purposes of illustration. The received signal then is cross-correlated with the transmitted signal as shown in FIG. 4C, and as will be described in more detail below.

Figure 5B:
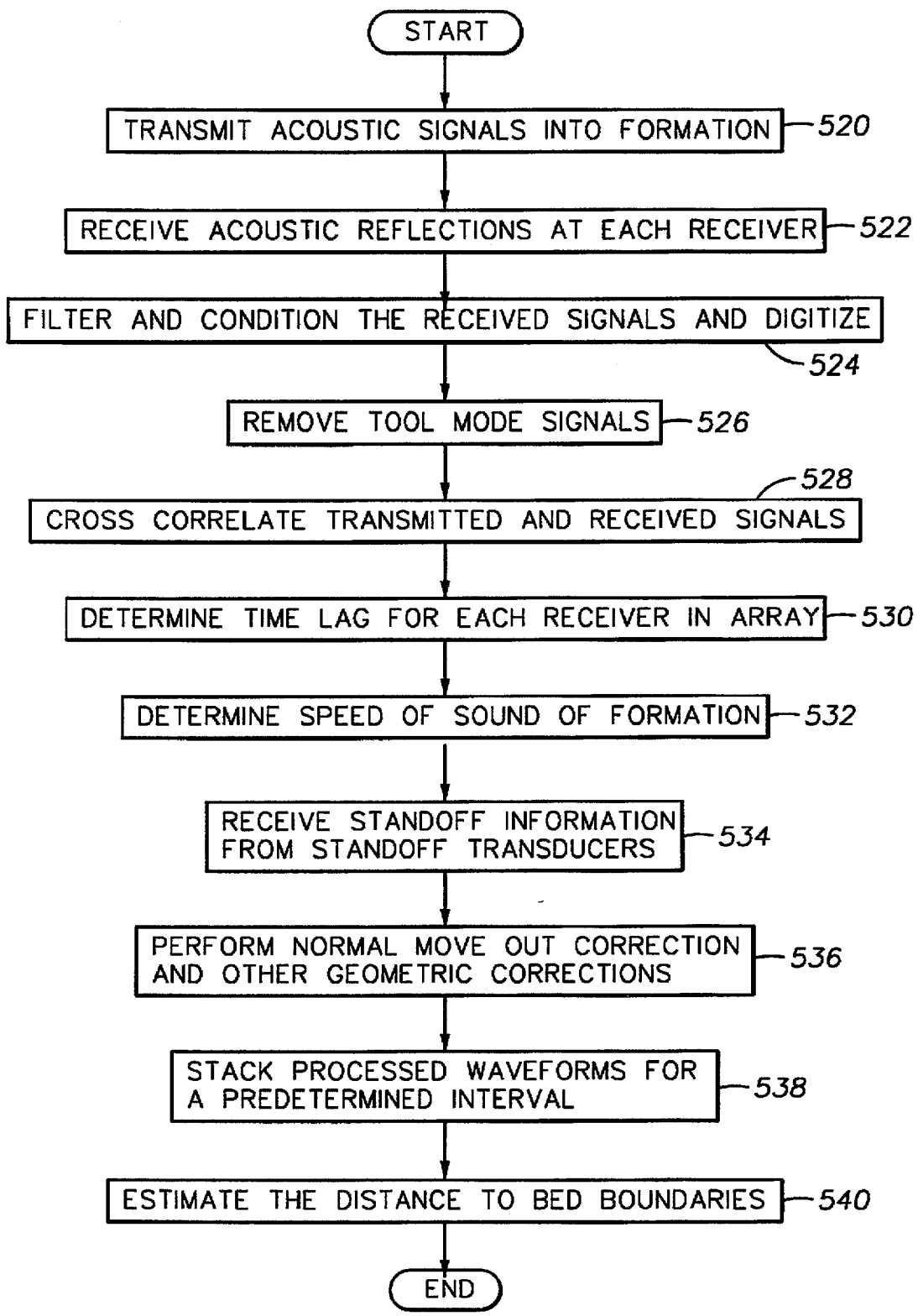
FIG. 5B is an operation flow chart illustrating the manner in which the microprocessor of FIG. 2B performs a bed boundary distance determination.

Referring now to FIGS. 2B, 4A–4C, and 5B the operation of the swept frequency embodiment will now be described. Referring first to FIGS. 2B and 5B, the microcontroller 150 initiates transmission of the acoustic signal (step 520 in FIG. 5B) by generating a digital representation of the desired signal. In the preferred embodiment, the microcontroller generates a transmission signal that has a swept frequency. As shown in FIG. 4A, the transmission signal varies continuously from a relatively low frequency to a relatively high frequency to facilitate signal recovery in a high noise environment.

The digital transmission signal is applied to the FIFO buffer 171, which accumulates the transmission signals. In the preferred embodiment, the digital transmission signal comprises approximately 1000 discrete points, each of which is represented by an appropriate digital signal. When the FIFO buffer 171 has been loaded with these discrete digital signals, the microcontroller 150 generates a control signal to the gate array sequencer 183, which drives a control signal to the FIFO buffer 171 to enable the FIFO buffer to begin transmitting the digital transmission signal at a fixed rate (which is dependent on the operating speed of the D/A converter 295 and transmitter $T_x$). The output signal from the FIFO buffer 171 is applied to the D/A converter 295 to obtain an analog signal that is applied to the transmitter $T_x$. The transmitter responds by generating an acoustic signal that is fired into the formation.

In step 522 of FIG. 5B, the reflected signals begin to be received at the receivers (only $R_1$, $R_2$ are shown in FIG. 2B for ease of illustration). As shown in the exemplary received signal of FIG. 4B, the swept frequency signal of FIG. 4A is embedded in noise and cannot be visually discerned in the received signal. The receivers $R_1$, $R_2$, $R_3$, $R_4$ produce an analog electrical signal that is filtered, conditioned and digitized by the signal conditioning circuitry 91 and A/D converters 120 (step 524). The digitized signals are loaded into the FIFO buffers 130, and transmitted at a uniform rate to the DSP 165 on the high speed data bus 140.

The DSP 165 also receives the digital signals indicative of the transmission signal, preferably from the output of the FIFO buffer 171 in order to insure proper timing of the transmission signal. The early arriving tool mode signals are eliminated in step 526. The DSP 165 in step 528 cross-correlates the transmitted and received signals, as will be discussed in more detail below. In the preferred embodiment, transform domain techniques are implemented to perform the cross-correlation. FIG. 4C illustrates the results of the cross-correlation. Alternatively, time domain summations may be used for the cross-correlation.

After the cross-correlation is complete, the time lag or transit time between transmission and reception of the signal is determined in step 530 by either the DSP 165 or the microcontroller 150. This time lag $\Delta t_L$ may be transmitted to the surface for a real-time indication of time lag. Alternatively, the time lag signal $\Delta t_L$ can be used downhole as part of a closed loop drilling system. Knowing the time lag and the velocity of sound in the formation gives the distance to formation boundaries, as set forth in equation (1) above.

As an alternative to measuring the speed of sound (step 532) of the formation with acoustic logging tool 50, the type of rock can be determined from historical logs. Standoff and geometric corrections are made in steps 534, 536, and the waveforms are stacked in step 538. In step 540, the DSP 165 or microcontroller 150 can determine distance to bed boundaries.

The manner in which cross-correlation is performed will now be discussed with reference to FIGS. 4A–4C and 6. Cross-correlation can be implemented with the DSP either by using transform domain techniques, or by using time domain summations. The implementation of transform domain techniques has the advantage of being significantly faster, enabling the system to extend the length of the transmission period, and increasing the number of samples taken in each transmission period, while still providing a time lag determination in a reasonable period of time. In the preferred embodiment, time lag signals may be derived once every couple of seconds. The processing time, however, preferably is less than one second. As will be apparent to one skilled in the art, transform domain processing time is much faster than time domain processing.

Figure 6:
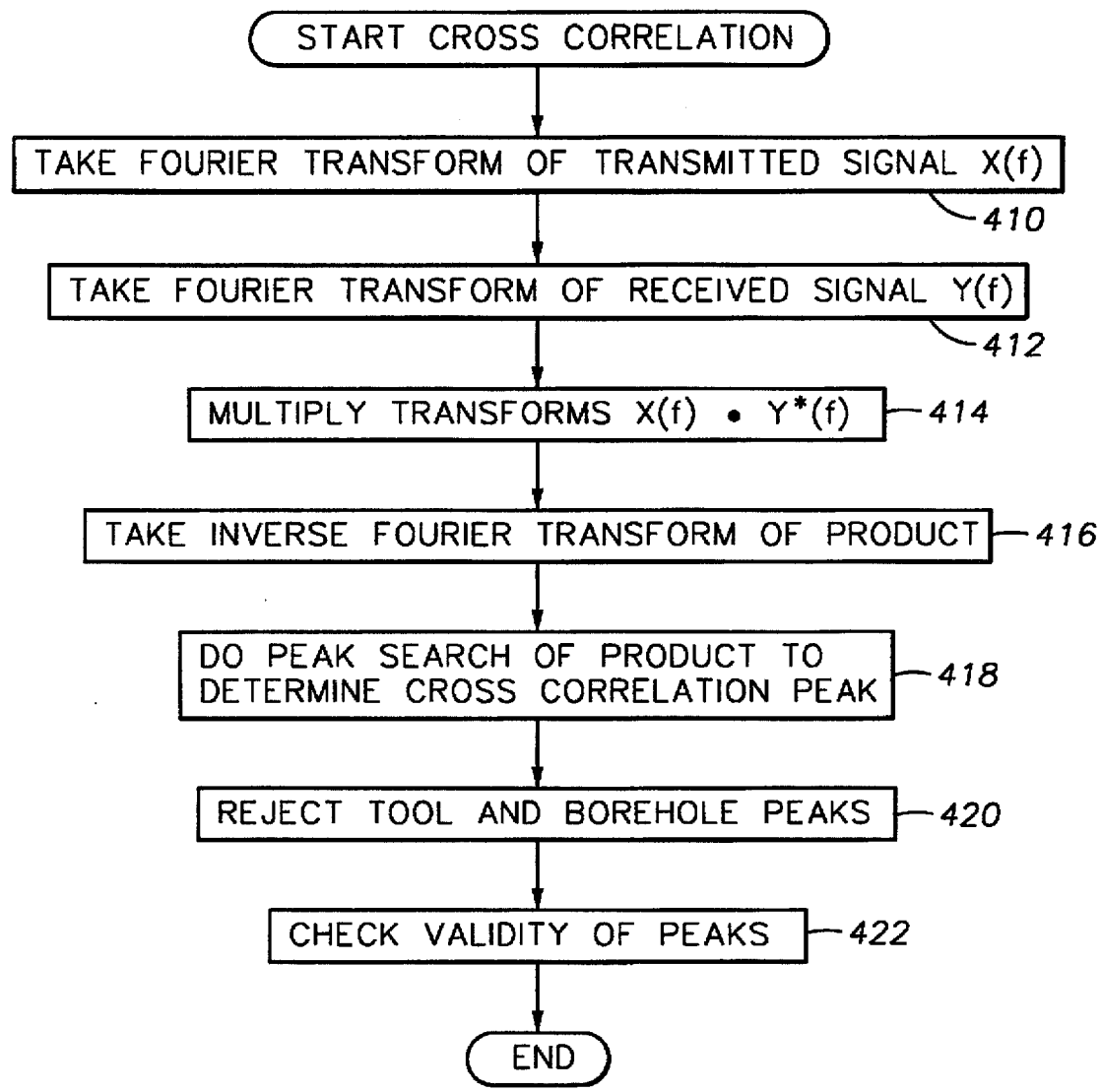
FIG. 6 is a flow chart illustrating the preferred method of implementing the cross-correlation step of FIG. 5B.

FIG. 6 is a flow chart illustrating the operation of the system implementing transform domain techniques. In step 410, the DSP receives the digital transmission signal (preferably from the FIFO buffer output) and takes the Fourier transform of the digital transmission signal. After the received signals have been conditioned and digitized, the DSP then (in step 412) takes the Fourier transform of the received signal. In step 414, the DSP multiplies the transforms derived in steps 410 and 412 together to obtain a product of $X(f) \times Y^*(f)$, where $X(f)$ is the Fourier transform of the transmitted signal and $Y^*(f)$ is the Fourier transform of the received signal (time reflected), with a change of sign of the imaginary portion of the value, a complex conjugate of the spectrum $Y(f)$. The product of $X(f) \times Y^*(f) = F[x(t)*y(-t)]$, where the symbol * indicates the convolution operator in the time domain, and F denotes a Fourier transform of the convolution sum. The inverse Fourier transform then is taken of the product in step 416 to convert back to the time domain and to yield a cross-correlation time domain function.

In step 418, a peak search is performed on the product to indicate the time lag $\Delta t_L$ for the reflected signals. The use of the peak signals is based upon the principle that the cross-correlated product will yield a maximum at the point(s) where the two signals are aligned. Therefore, the value of the time lag at which the transmitted and received signals line up the best (i.e., where a peak is found) is taken as the most probable time lag $\Delta t_L$ for the reflected signal(s). Thus, in step 418, the peaks of the cross-correlation are determined. In step 420, the microcontroller rejects the peaks attributed to the tool reflections and the borehole refractions. Thus, referring to FIGS. 4C and 6, in step 420 the microcontroller rejects peaks A and B (and thus time lag values $t_A$ and $t_B$) as indicative of reflections from the tool itself and of the wellbore, leaving peaks C and D as indicative of reflections from bed boundaries. The time associated with these peaks, $t_C$ and $t_D$ are the time lag periods for the two detected bed boundaries. This time lag corresponds to the travel time for a path from transmitter to receiver in FIG. 7. The known array spacings for all receivers and the associated travel times permit one to calculate $\theta_B$ and $d_{BT}$. In step 422, the validity of these peaks are checked by the microcontroller to determine if they are valid. This can be done by comparing these signals with previous determinations, or by correlating the data with other available data.

In an alternative embodiment, time domain summations may be employed to determine time lag. In this embodiment, the received signal y(t) is multiplied by the transmitted signal x(t) at each discrete point and the products are combined to obtain a cross-correlation plot, which can be represented as $$R_{xy}(\tau) = \Sigma_{t=0}^{\tau}(x(t) \times y(t+\tau)) \tag{6}$$

where $R_{xy}(\tau)$ represents the cross-correlation of the transmitted signal x and the received signal y as a function of the time lag.

This computation then is repeated by shifting out one time constant for the received signal y(t), and multiplying each discrete point of x(t) with the corresponding discrete point of y(t) again. This process is repeated several times until the correlation impulse is found with the largest peak value. This time shift of y(t) then is selected as the time lag signal $\Delta t_{b,i}$ for that particular boundary.

The transducers in the acoustic logging tool can be specially configured as desired to provide greater acoustical steering capabilities or to enhance the ability of the tool to determine the direction of bed boundaries. Thus, while the present invention has been disclosed with a preferred acoustic transducer configuration, as shown in FIGS. 1 and 7, other configurations also may be used. As shown in FIG. 8, for example, two transmitter/receiver arrays 25a, 25b may be used which are diametrically opposed on the exterior of logging tool 50. In this embodiment, opposed transducers preferably are staggered to maximize the mechanical strength of the tool 50. The mechanical strength of the drill collar weakens if two transducer holes are drilled in the same azimuthal plane. The configuration shown in FIG. 8 has certain advantages over the single transmitter/receiver array shown in FIG. 1. Most notably, the arrangement of FIG. 8 can operate independently of a directional sensor, by firing one of the transmitters T and detecting reflected signals at each of the eight receivers R. Because of the delay caused by the transit time of the reflected wave across the borehole, the direction of the boundary can be extrapolated solely using the acoustic tool 50. This delay corresponds to an aperture equal to the diameter of the tool for steering in the plane perpendicular to the cylindrical axis of the tool. In the same vein, three receivers can be oriented in arrays around the circumference of the tool. One such array 355 is shown in cross-section in FIG. 9. FIG. 9 shows three receivers R spaced equidistantly around the circumference of the logging tool 350. The use of three receivers in an array permits unambiguous directional resolution of the bed boundary without rotating the tool, by providing three distance measurements. The maximum aperture in the plane perpendicular to the cylindrical axis is equal to the maximum distance between any two receivers in the plane.

Figure 11:
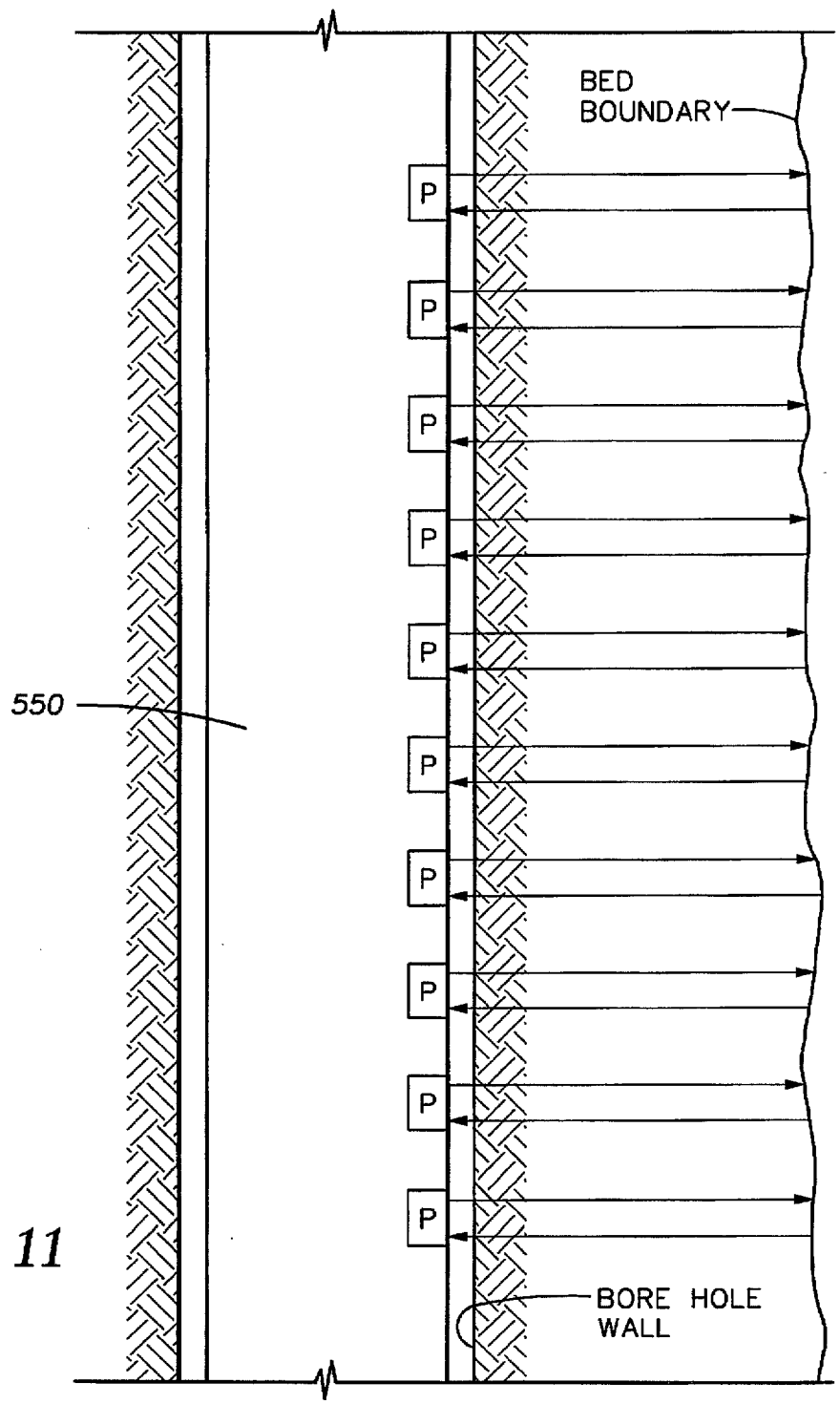
FIG. 11 shows a second alternative embodiment to the logging tool of FIG. 1, in which a plurality of pulse-echo transducers are provided in the logging tool to detect bed boundaries and to eliminate much of the processing required in the embodiment of FIG. 1.

Another advantageous embodiment of an acoustic logging tool is shown in FIG. 11. The acoustic logging tool 550 includes a plurality of pulse-echo transducers P which both transmit acoustic signals and receive reflections, as shown in FIG. 11. In one possible implementation of this concept, a number of closely spaced pulse-echo transducers P could be fired simultaneously to produce a highly collimated beam with a large amplitude. By using pulse-echo transducers, the geometric effects discussed with respect to FIG. 7 are eliminated, because the acoustic waves travel to and from the boundary in a direction perpendicular to the longitudinal axis of logging tool 550. Thus, as a result, the normal move out and geometric corrections could be eliminated from the processing of the received signals. This method is primarily useful for a condition where $\theta_B=0$ in FIG. 7, but can apply to nonzero values of $\theta_B$ if the receiver is steered.

Figure 15:
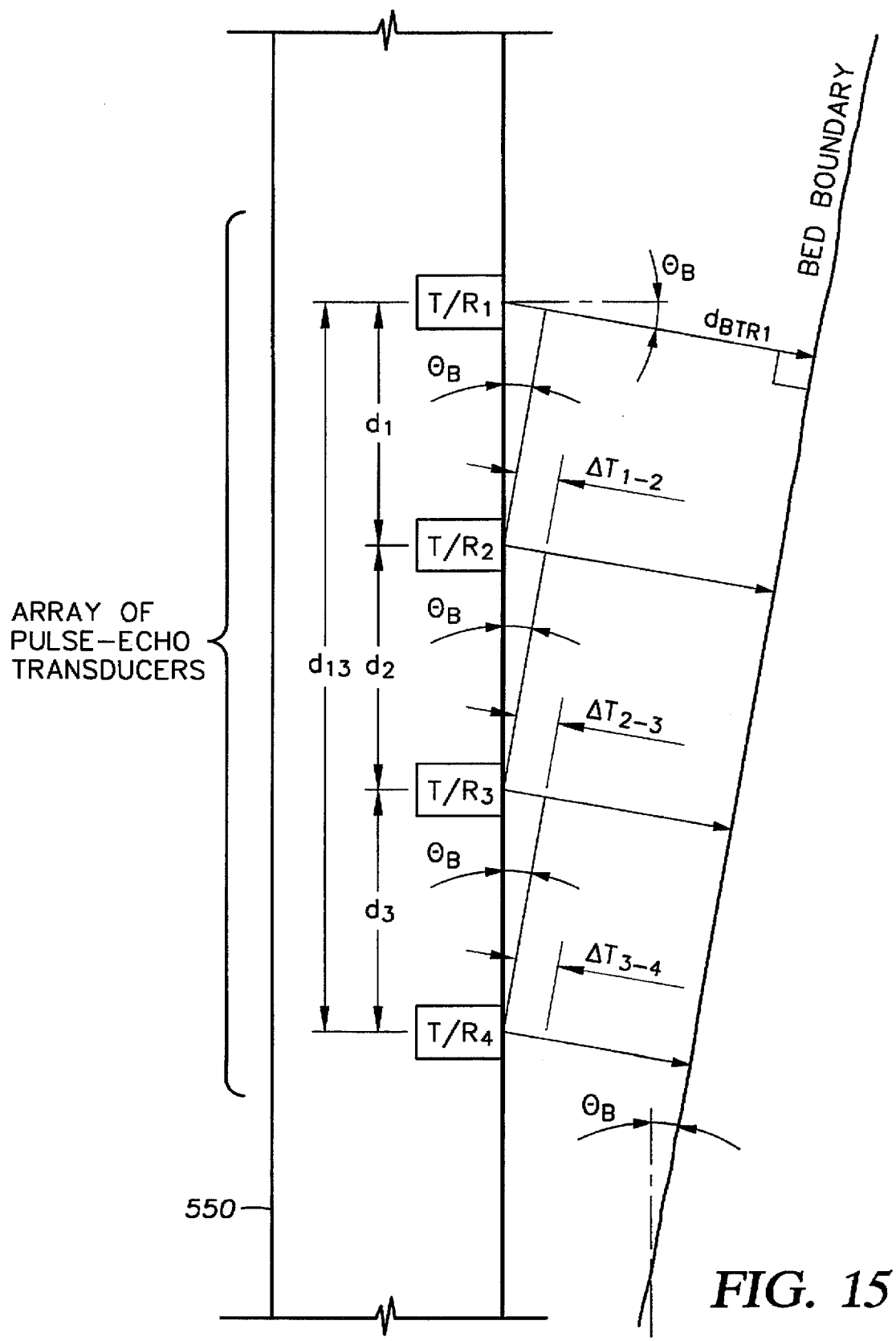
FIG. 15 illustrates an exemplary manner of steering the pulse-echo transducers of FIG. 11 to determine distance and orientation of a bed boundary with respect to the logging tool.
Figure 16A:
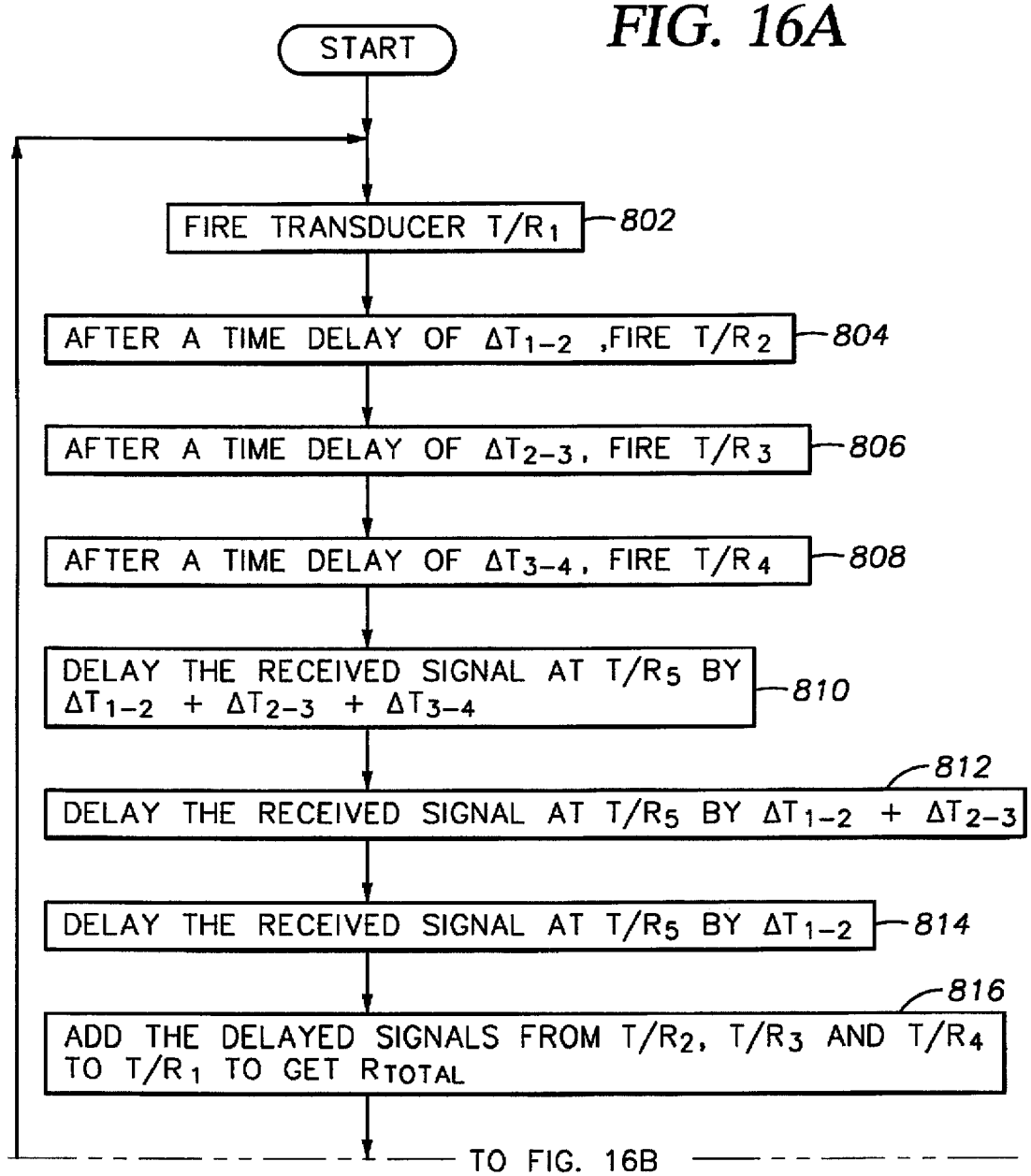
FIG. 16 is a flow chart depicting the manner in which the steered array of FIG. 15 is operated to determine bed boundary distance and orientation.
Figure 16B:
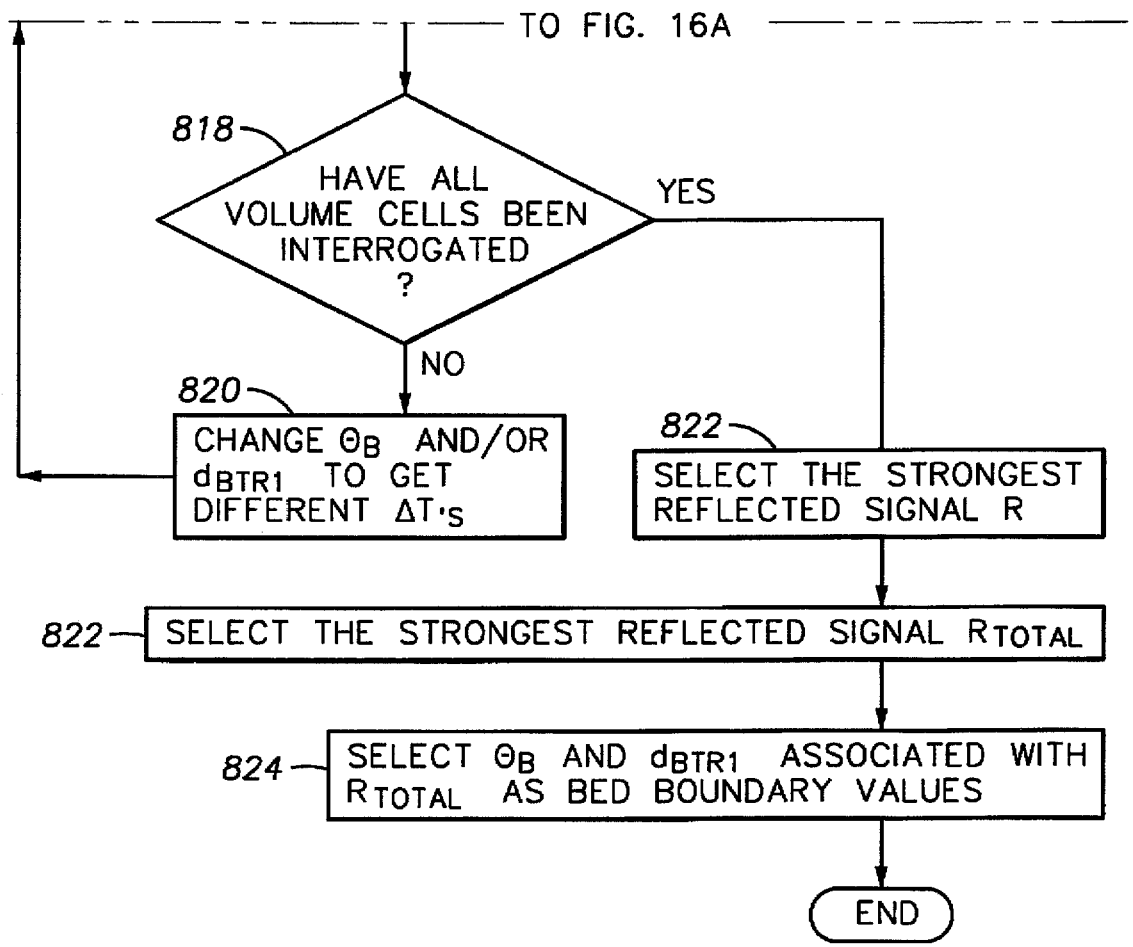

In addition, the pulse echo transducer array depicted in FIG. 11 could be steered for transmitting and receiving to detect bed boundaries converging or diverging with the intended borehole path. Referring now to FIG. 15, the acoustic logging tool 550 is shown with a bed boundary converging at an angle $\theta_B$. The acoustic logging tool is shown with four pulse echo transducers or transceivers (identified as T/R$_1$, T/R$_2$, T/R$_3$, T/R$_4$) for purpose of illustration. Travel paths of acoustic signals normal to the bed boundary are shown for each transceiver. The distance of the travel path between the first transceiver T/R$_1$, and the bed boundary is shown as $d_{BTR1}$. As generally discussed above with respect to the receiver array of FIG. 7, the transceivers T/R$_1$, T/R$_2$, T/R$_3$, T/R$_4$ of FIG. 15 can be steered and collimated to investigate volume cells around or in front of the borehole. Referring now to FIGS. 15 and 16, the first transducer T/R$_1$, is fired in step 802. After a time delay of $\Delta t_{1-2}$, transducer T/R$_2$ is fired in step 804.

As shown in FIG. 15, the time delay $\Delta t_{1-2}$ represents the additional time necessary for the acoustic wave to travel between the boundary and T/R$_1$, as compared to the travel time between the boundary and T/R$_2$. This time delay $\Delta t_{1-2}$ is determined by the angle of steering $\theta$. When the angle of steering equals the converging boundary angle $\theta_B$, then a maximum response is achieved for the summed transceivers.

In step 806, after an additional time delay of $\Delta t_{2-3}$ passes, transceiver T/R$_3$ is fired. After a further time delay of $\Delta t_{3-4}$, transceiver T/R$_4$ is fired (step 808). In step 810, the signals received at T/R$_4$ are delayed by a time $\Delta t=\Delta t_{1-2}+\Delta t_{2-3}+\Delta t_{3-3}$. Similarly, in step 812, the signals received at T/R$_3$ are delayed by a time $\Delta t=\Delta t_{1-2}+\Delta t_{2-3}$. In similar fashion, the signals received by transceiver T/R$_2$ are delayed a time period of $\Delta t_{1-2}$ in step 814. The delayed signals are summed in step 816 together with the signals received by transceiver T/R$_1$ to get an $R_{TOTAL}$.

If all volume cells of interest have not yet been interrogated (step 818), then the steering angle $\theta$ is changed to obtain different $\Delta t$ values (step 820). If pulse-echo transducers are not used (as shown in FIG. 7) then the $d_{BTR1}$ values can also be changed. After all volume cells have been checked, the strongest reflected signal ($R_{TOTAL}$) is chosen as representative of the bed boundary, which then indicates the orientation angle $\theta_B$ of the boundary. The distance to the boundary $d_{BTR1}$ is easily derived from the transit time for the T/R$_1$ signal, knowing the speed of sound of the formation.

Figure 12:
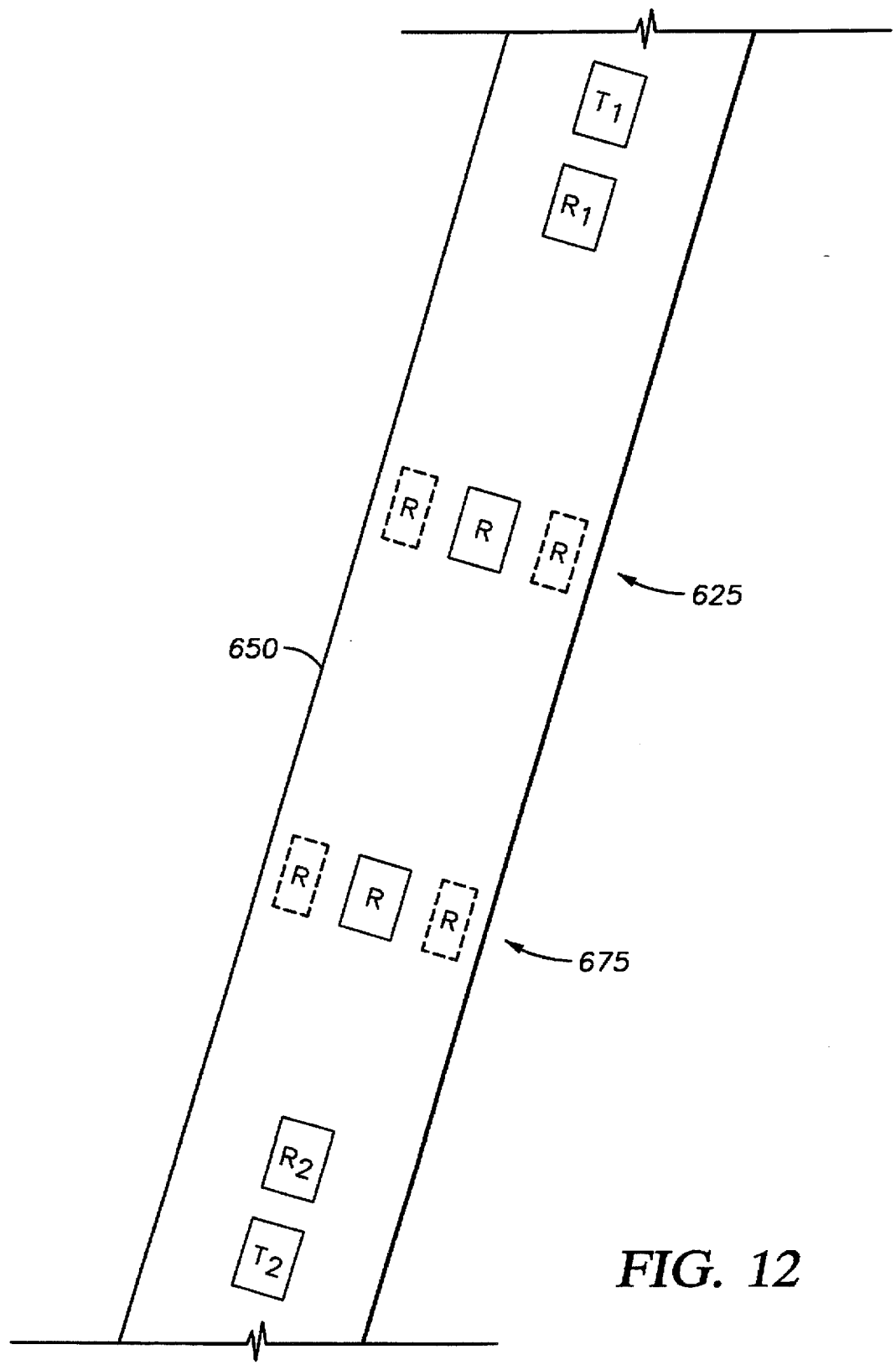
FIG. 12 shows another embodiment of the acoustic logging tool of FIG. 1, in which multiple receiver arrays are positioned around the circumference of the logging tool.

Another possible implementation for the logging tool is shown in FIG. 12. FIG. 12 shows a logging tool 650 with a transmitter T$_1$, and an associated receiver R$_1$ aligned axially therewith. At the other end of the tool 650, a second transmitter T$_2$ and receiver R$_2$ are axially aligned diametrically opposed to the first transmitter/receiver pair. Between the two transmitter/receiver pairs are a plurality of other receiver arrays 625, 675. Each of these arrays includes three receivers, oriented substantially as shown in FIG. 9, to provide directional measurements regarding bed boundaries. In operation, the associated transmitter/receiver pairs would operate substantially as pulse-echo transducers. The receiver arrays would then provide additional information about directional information, as well as supplementing the distance measurements produced by the associated receiver.

Figure 13:
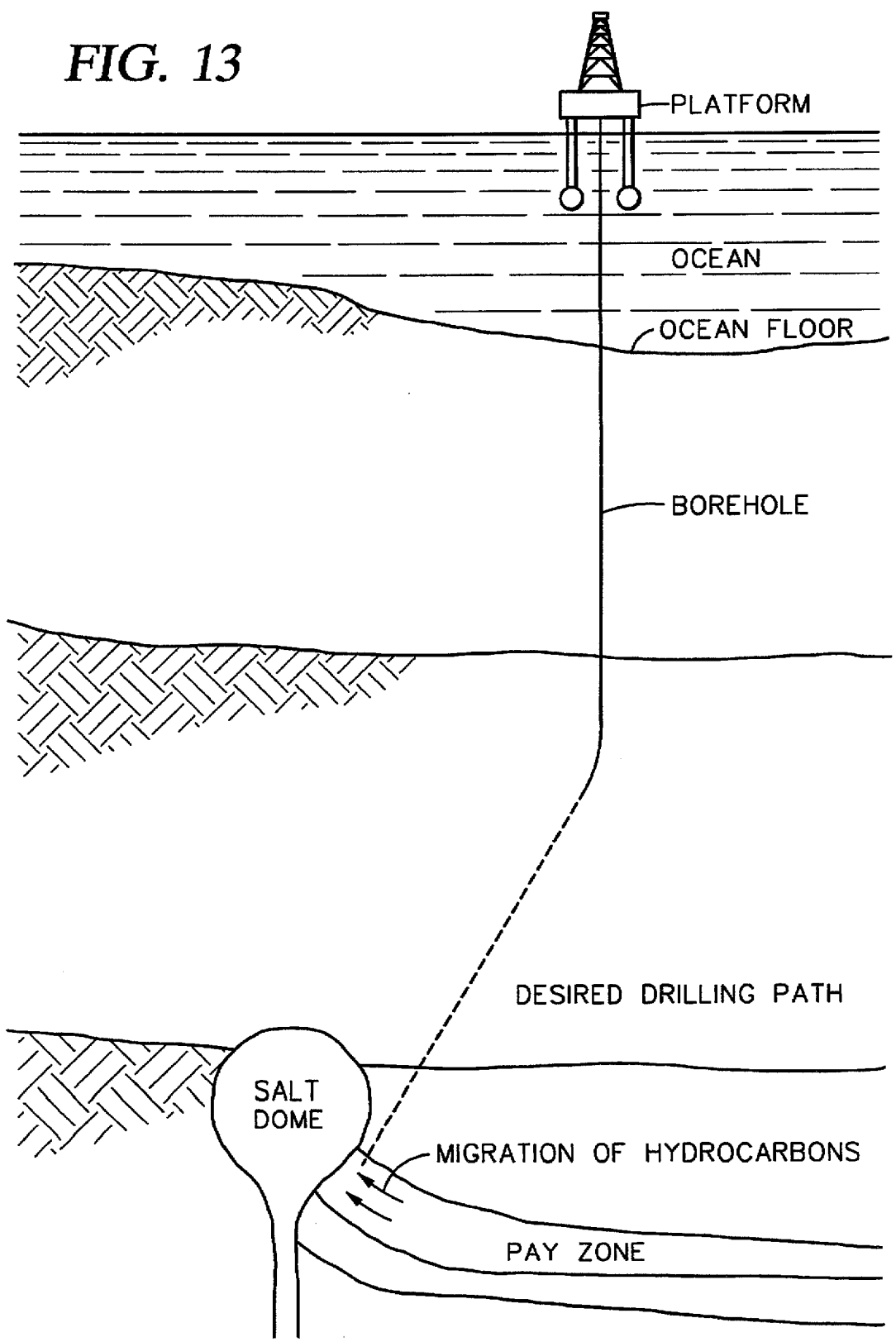
FIG. 13 is a drawing depicting an offshore well plan which could benefit from using the present invention to recover hydrocarbons from beneath a salt dome.
Figure 14:
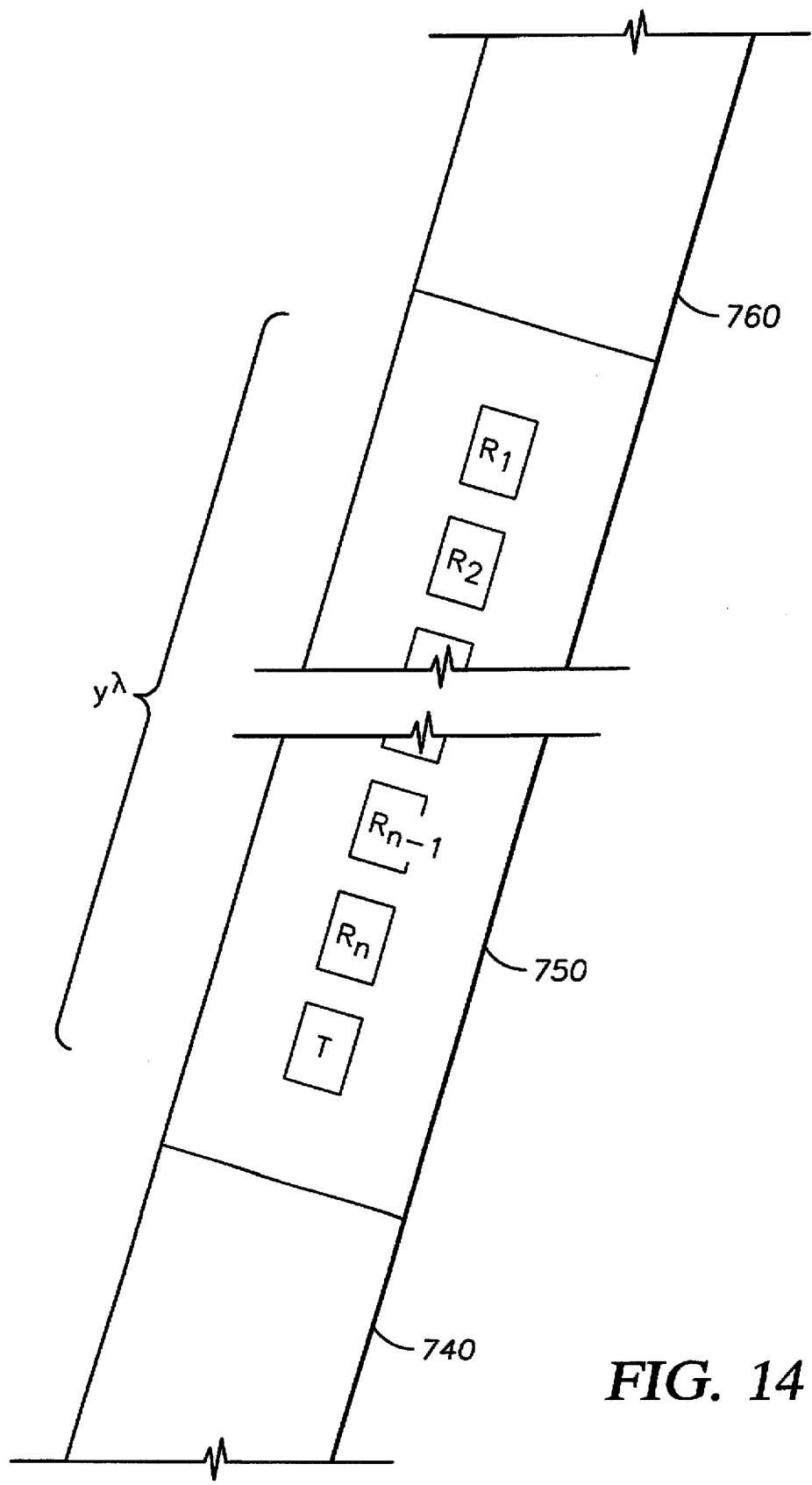
FIG. 14 shows another embodiment of the acoustic logging tool of FIG. 1 which is especially adapted to look at boundaries ahead of the drill bit.

Referring now to FIGS. 13 and 14, an embodiment is shown for the logging tool which is designed specifically for use in determining bed boundaries ahead of the bit. Referring to FIG. 13, there are many situations in which it is desirable to took for bed boundaries in front of the drill bit. One such situation is shown in FIG. 13. FIG. 13 shows a well plan in which the desired wellbore path is to drill underneath a salt dome. Typically, salt domes cause surrounding formations to be dragged up as the dome is formed. To the extent that hydrocarbons are present in any of these zones, the hydrocarbons will tend to migrate upwardly, in the direction of the salt dome. It is thus desirable to drill as close as possible to the salt dome. The downside to doing this is that the wellbore conditions can be seriously degraded if the borehole enters the salt dome. Thus, it would be extremely beneficial if the boundary between the salt and the pay zone could be located in advance of the drill bit.

One possible configuration for implementing such an acoustic tool is shown in FIG. 14. FIG. 14 shows an acoustic logging tool 750, which includes at least one transmitter T, and a plurality of axially aligned receivers $R_1, R_2, \ldots R_{n-1}, R_n$. As shown in the embodiments of FIGS. 8 and 12, other receiver configurations also may be used as desired. As shown in FIG. 14, the receiver array may extend a substantial distance to define a relatively large aperture. If desired, the tool 750 may actually comprise a number of sections of drill collar, to permit the receiver aperture to be as large as necessary to provide the requisite steering capabilities. In the preferred embodiment, the aperture has a minimum axial length equal to the wavelength ($\lambda$) of the transmitted acoustic signal. Preferably, as shown in FIG. 14, the aperture has an axial length that is a multiple y of the wavelength ($\lambda$). Acceptable ranges of the aperture are in the order of $1(\lambda)$ –$5(\lambda)$.

The frequency f of the transmitted signal must be low enough to avoid the potential effects of attenuation. Acceptable frequency ranges are on the order of 100 Hz–1000 Hz, and either a swept frequency transmission signal or a short acoustic pulse signal may be employed. The wavelength ($\lambda$) of such a signal is determined by the velocity v of the intervening formation, as follows:

$$\lambda = v/f \qquad (7)$$

As the above equation indicates, the wavelength ($\lambda$) increases as the frequency decreases. As the wavelength increases, the aperture of the receiver assembly must be similarly increased to provide the necessary wavelength multiple.

In an automatic closed loop system in which the bottomhole assembly 100 is being steered automatically or semi-automatically by the downhole controller 150, the controller uses the bed boundary distance measurements and the directional information from directional sensors 40 (FIG. 1). Referring now to FIG. 10A, an exemplary flow chart is shown depicting the operation of the microprocessor 150 in an automated or semi-automated drilling system. In step 602 the microprocessor determines a distance to adjacent bed boundaries during a first measuring interval period. These distance estimations preferably are correlated with directional measurements in step 604, to coordinate the distance of the beds with the direction, referenced from the borehole. While this information could be used independently to steer the BHA 100, it is preferred that distance readings be taken over certain time or depth intervals to increase the accuracy of the measurements, and to provide perspective on how the bed boundary is changing relative to the inclination of the borehole.

Thus, in step 606, the microprocessor preferably determines a distance to bed boundaries at a subsequent interval. The interval may represent a depth, (such as, for example, ten feet from the previous interval), or may represent a predetermined period of time (such as one-half hour). The distance measurements obtained in step 606 are again correlated with directional measurements in step 608. This step of obtaining distance and directional measurements may be repeated to obtain any number of readings, as desired.

The microprocessor compares the distance measurements in step 610, and based upon the various readings, calculates a dip angle for the various detected bed boundaries. In step 612, the microprocessor determines which bed boundaries are closest to the borehole, and which boundaries are converging (or diverging) on the intended borehole path. In step 614 the microprocessor analyzes whether the BHA is in a pay zone. If the BHA is in a pay zone, the microprocessor steers the BHA away from converging boundaries, and away from the nearest boundary, in an attempt to stay centralized in a pay zone (step 624). In this regard, the microprocessor causes the bottomhole assembly to change inclination in the desired direction. This can be done through the use of assignee's adjustable bladed stabilizer system, disclosed in U.S. Pat. Nos. 5,318,137 and 5,318,138. If the microprocessor 150 is unable to determine which boundary is closer, the system maintains its present course.

Conversely, if the BHA is not in a pay zone, the present invention can be used to assist the driller in finding a pay zone, and relaying pertinent data to the surface, or can be used to automatically drill in the direction of a potential pay zone. In addition to providing distance measurements, the acoustic signals received by the receiver array 25 as reflections from the bed boundary also can provide certain information regarding the characteristics of the bed. The signals received by the receiver array preferably are analyzed in step 616 to note the phase of the received wave, the amplitude of the wave, and the shape of the waveform, all of which provide valuable insight into the characteristics of the formation. In an exemplary embodiment, a read only memory (ROM) can be provided downhole which contains preprogrammed desired formation characteristics, which can be compared with measured formation characteristics. If the microcontroller finds an acceptable match in step 618 between preprogrammed characteristics and measured characteristics, the BHA can be steered toward the favorable formation, as shown in step 626.

In similar fashion, the microprocessor can analyze each of the other detected formation boundaries (steps 620 and 622) to determine if the other boundaries exhibit favorable characteristics. Also, acoustic modes having different speeds of sound reflected from a single boundary can be distinguished from second boundaries. The order of analyzing formations may be done based either on the distance to the formation boundaries (with the closest boundary examined first), or based on the direction of the boundaries. If none of the detected boundaries exhibit favorable characteristics, then the BHA continues drilling according to the well plan, as shown in step 628.

In FIG. 10B, a similar flow chart is depicted for system operation if the receiver array includes transducers positioned about the circumference of the logging tool to provide directional information. Examples of such a tool are shown in FIGS. 8, 9 and 12, for example. The primary difference in FIG. 10B is that the acoustic logging tool determines directional information without resorting to rotating the drill string.

Referring to FIG. 10B, the microprocessor determines in step 602' a distance to adjacent bed boundaries for each receiver array during a first measuring interval period. These distance estimations from the various receiver arrays preferably are correlated to obtain directional information in step 604'. While this information could be used independently to steer the BHA 100, it is preferred that distance readings be taken over certain time or depth intervals to increase the accuracy of the measurements, and to provide perspective on how the bed boundary is changing relative to the inclination of the borehole.

Thus, in steps 606' and 608', steps 602' and 604' are repeated for one or more subsequent intervals. The microprocessor compares the distance measurements in step 610', and based upon the various readings, calculates a dip angle for the various detected bed boundaries. In step 612', the microprocessor determines which bed boundaries are closest to the borehole, and which boundaries are converging (or diverging) on the intended borehole path. In step 614' the microprocessor analyzes whether the BHA is in a pay zone. If the BHA is in a pay zone, the microprocessor steers the BHA away from converging boundaries, and away from the nearest boundary, in an attempt to stay centralized in a pay zone (step 624'). In this regard, the microprocessor causes the bottomhole assembly to change inclination in the desired direction. This can be done through the use of assignee's adjustable bladed stabilizer system, disclosed in U.S. Pat. Nos. 5,318,137 and 5,318,138. If the microprocessor 150 is unable to determine which boundary is closer, the system maintains its present course.

Conversely, if the BHA is not in a pay zone, the present invention can be used to assist the driller in finding a pay zone, and relaying pertinent data to the surface, or can be used to automatically drill in the direction of a potential pay zone.

In addition to providing distance measurements, the acoustic signals received by the receiver array 25 as reflections from the bed boundary also can provide certain information regarding the characteristics of the bed. The signals received by the receiver array preferably are analyzed in step 616' to note the phase of the received wave, the amplitude of the wave, and the shape of the waveform, all of which provide valuable insight into the characteristics of the formation. In an exemplary embodiment, a read only memory (ROM) can be provided downhole which contains preprogrammed desired formation characteristics, which can be compared with measured formation characteristics. If the microcontroller finds an acceptable match in step 618' between preprogrammed characteristics and measured characteristics, the BHA can be steered toward the favorable formation, as shown in step 626'.

In similar fashion, the microprocessor can analyze each of the other detected formation boundaries (steps 620' and 622') to determine if the other boundaries exhibit favorable characteristics. The order of analyzing formations may be done based either on the distance to the formation boundaries (with the closest boundary examined first, or based on the direction of the boundaries. If none of the detected boundaries exhibit favorable characteristics, then the BHA continues drilling according to the well plan, as shown in step 628'.

While several exemplary embodiments of the present invention have been shown and described, modifications thereof can be made by one skilled in the art without departing from the spirit of the invention.

We claim:

1. A logging while drilling acoustic tool for a bottomhole drilling assembly, comprising:
   a transmitter assembly in said bottom hole assembly for generating an acoustic wave signal that is transmitted into the formation;
   a receiver assembly in said bottomhole assembly for receiving acoustic wave reflections from a bed boundary, and generating an electrical signal indicative of the received acoustic reflections;
   a processor receiving said electrical signal from said receiver, and correlating said received electrical signal to the signal transmitted by said transmitter to determine distance to a bed boundary and the orientation angle of the bed boundary; and
   wherein said processor generates a transmission signal that is applied to said transmitter assembly.

2. A tool as in claim 1, wherein said transmission signal comprises a swept frequency signal.

3. A tool as in claim 1, wherein the transmission signal comprises a short acoustic pulse.

4. A tool as in claim 1, wherein the receiver assembly is steered and collimated in a particular direction by providing a sufficient receiver aperture and particular time delays used to align the received signals for summing by said processor.

5. A tool as in claim 2, wherein the processor comprises a digital signal processor.

6. A tool as in claim 5, wherein said swept frequency transmission signal also is transmitted to said digital signal processor.

7. A tool as in claim 6, wherein said digital signal processor cross-correlates the swept frequency transmission signal with the electrical signal indicative of the received reflections.

8. A tool as in claim 7, wherein the cross-correlation implements transform domain multiplication.

9. A tool as in claim 7, wherein the cross-correlation implements time domain summations.

10. A tool as in claim 1, wherein said receiver assembly includes a plurality of receivers that are aligned axially along the exterior of the tool.

11. A system as in claim 1, wherein the transmitter assembly includes a first transmitter at one end of said tool and a second transmitter at the opposite end of said tool.

12. A system as in claim 5, wherein said electrical signal indicative of the received reflections comprises an analog signal, and said logging while drilling system includes a high precision analog-to-digital converter for converting said analog signal to a digital signal.

13. A system as in claim 12, further comprising a first in, first out buffer for accumulating the digital signals from said analog-to-digital converter.

14. A system as in claim 13, wherein said first in, first out buffer provides a digital output signal to said digital signal processor via a high speed data bus.

15. A system as in claim 13, further comprising a flash memory array connected to said processor for goring the digital output signals from said first in, first out buffer.

16. A system as in claim 7, wherein said processor determines a time lag signal from said cross-correlation indicative of a bed boundary.

17. A system as in claim 16, wherein said processor determines multiple time lag signals representative of different boundaries.

18. A system as in claim 16, wherein said processor generates a signal to a mud pulser unit indicative of said time lag signal.

19. A system as in claim 16, wherein said processor automatically controls the inclination of said bottomhole assembly in response to said time lag signal.

20. A logging while drilling system, as part of a bottomhole assembly which drills through downhole formations, for providing an indication of the distance to bed boundaries, comprising:
   a transmitter assembly for generating acoustic signals into the formation;
   a receiver assembly detecting reflected acoustic signals from bed boundaries;
   a downhole processing unit for correlating the reflected signals received by said receiver assembly with the acoustic signals generated by said transmitter to remove extraneous noise and to determine a time lag for the reflected signals, said downhole processing unit using said time lag and speed of sound of the formation to determine the distance to bed boundaries.

21. A system as in claim 20, wherein said processing unit also determines the orientation of the bed boundary by steering and collimating the receiver assembly and summing the received reflected acoustic signals to determine the direction which provides the largest summed signal.

22. A system as in claim 21, wherein said transmitter assembly comprises a first transmitter and a second transmitter which fire acoustic pulses alternately.

23. A system as in claim 22, wherein said downhole processing unit determines a first waveform for each receiver for acoustic signals reflected from said first transmitter, and a second waveform for each receiver for acoustic signals reflected from said second transmitter.

24. A system as in claim 23, wherein said downhole processing unit performs a geometric correction on the first and second waveforms for each of the acoustic receivers to steer and collimate the acoustic waves by adjusting time delays between signals received by each receiver.

25. A system as in claim 24, wherein said downhole processing unit stacks the first and second waveform signals to produce a single waveform for a particular interval.

26. A system as in claim 20, wherein said receiver assembly comprises a plurality of receivers that are axially aligned with said transmitter assembly.

27. A system as in claim 26, further comprising a second receiver assembly that is positioned generally diametrically opposite the first receiver assembly.

28. A system as in claim 27, wherein said downhole processing unit compares the time at which the first receiver receives reflected acoustic signals with the time at which the second receiver assembly receives acoustic signals to determine the location of the bed boundary.

29. A system as in claim 28, wherein said downhole processing unit causes said bottomhole assembly to steer away from said bed boundary.

30. A system as in claim 20, wherein said downhole processing unit comprises a digital signal processor and a microprocessor.

31. A system as in claim 30, further comprising a flash memory array connected to said microprocessor for storing the reflected signals received by said receiver assembly.

32. A system as in claim 30, wherein said digital signal processor comprises a floating point processor.

33. A system as in claim 32, wherein said digital signal processor performs a Fourier transform on the transmission signal and a Fourier transform of the received signal, and multiplies the transformed signals together to obtain a product.

34. A system as in claim 33, wherein said digital signal processor performs an inverse Fourier transform on the product.

35. A system as in claim 34, wherein said microprocessor detects the peaks of the inverse Fourier transform of the product, to determine time lag for reflected signals.

36. A system as in claim 35, wherein said microprocessor connects to a mud pulser unit and transmits a signal indicative of said time lag to the mud pulser unit for transmission to the surface.

37. A system as in claim 35, wherein said microprocessor calculates a distance to the boundaries based upon the time lag.

38. A system as in claim 37 wherein the microprocessor determines the orientation of the bed boundaries by steering and collimating the direction of the acoustic wave, and summing the received acoustic signals to determine the optimal time delay $\Delta t$ for the receivers.

39. A method for geosteering a bottomhole assembly, comprising the steps of:

transmitting acoustic signals into the formation;
receiving reflected acoustic signals;
generating an electrical signal representative of the received signals;
correlating the transmitted and received reflected acoustic signals;
determining the time lag for the received reflected acoustic signals;
determining the formation speed of sound;
identifying bed boundaries based upon the time lag determination and the speed of sound determination; and
steering the bottomhole assembly based upon the identification of bed boundaries.

40. A method as in claim 39, wherein the received acoustic signals are steered and collimated in a radial/axial plane relative to the bottomhole assembly and the steering direction giving maximum reflection amplitude is considered to be perpendicular to the bed boundary.

41. A method as in claim 39, wherein the transmitted acoustic signals comprise a swept frequency signal.

42. A method as in claim 41, wherein the step of correlating the transmitted and received reflected acoustic signals comprises implementation of transform domain techniques.

43. A method as in claim 42, wherein said transform domain techniques includes the steps of;
taking the Fourier transform of the transmitted signal;
taking the Fourier transform of the received signal;
multiplying together the transformed transmitted signal with the transformed received signal to obtain a product;
taking the inverse Fourier transform of the product.

44. A method as in claim 43, wherein the step of determining the time lag for the received reflected acoustic signals includes performing a peak search of the inverse Fourier transform of the product.

45. A method as in claim 39, wherein the step of correlating the transmitted and received reflected acoustic signals comprises implementation of time domain summation.

46. A method as in claim 39, wherein the transmitted acoustic signal comprises a short acoustic pulse.

47. A method as in claim 46, wherein the short acoustic pulse has a positive amplitude wave and a negative amplitude wave.

48. A method as in claim 47, wherein the negative amplitude wave is greater than the positive amplitude wave.

49. A method as in claim 48, wherein the negative amplitude wave has approximately twice the amplitude of the positive amplitude wave.

50. A method as in claim 47, wherein the pulse has a frequency in the range of 5 kHz to 20 kHz.

51. A method as in claim 50, wherein the frequency is approximately 12kHz.

52. A method as in claim 46, wherein bed boundaries are determined in each of the separate directions and the step of steering the bottomhole assembly is based upon the location of bed boundaries in each of the separate directions.

53. A method as in claim 39, wherein the received acoustic signals are obtained from discrete, separate directions.

54. A method as in claim 53, wherein bed boundaries are determined in each of the discrete, separate directions and the step of steering the bottomhole assembly is based upon the location of bed boundaries in each of the discrete, separate directions.

55. A method for automatically steering a drill bit which is drilling through a downhole formation, comprising the steps of:

transmitting an acoustic signal into the formation;

receiving reflected acoustic signals;

cross-correlating said received reflected signals with the transmitted acoustic signals;

determining a time lag for a bed boundary based upon the time difference between transmitting the acoustic signal and receiving the reflected acoustic signal;

changing the direction in which said drill bit drills based upon the time lag signal.

56. A system for a bottomhole drilling assembly, comprising:

a transmitter assembly for transmitting acoustic signals into a formation;

a receiver assembly for detecting reflected acoustic signals;

a digital signal processor receiving signals indicative of the transmitted acoustic signals and the received acoustic signals, said digital signal processor cross-correlating the received signal to obtain a cross-correlated product; and a microprocessor connected to said digital signal processor, said microprocessor analyzing said cross-correlated product to determine time lag for the received signals.

57. A system as in claim 56, wherein the time lag indicates the time for the reflected signal to reflect from a boundary.

58. An acoustic logging while drilling system for determining bed boundaries ahead of the drill bit, comprising:

a section of tubing;

an acoustic transmitter assembly located in said tubing section for transmitting a relatively low frequency signal into the formation ahead of the drill bit, said relatively low frequency signal have a wavelength (λ);

an acoustic receiver array located in said tubing section for receiving reflections of said relatively low frequency signal, said receiver assembly including a first receiver and a second receiver, and said first and second receivers are separated a distance equal to or greater than the wavelength (λ) of the transmitted wave.

59. A system as in claim 58, wherein said first and second receiver are separated a distance of 1–5 wavelengths (λ).

60. A system as in claim 58, wherein the frequency of said low frequency signal is in the range of 100 Hz–1000 Hz.

61. A system as in claim 60, wherein the transmission signal comprises a swept frequency signal.

62. A system as in claim 60, wherein said transmission signal comprises a short acoustic pulse signal.

63. A system as in claim 58, wherein said section of tubing comprises a plurality of collars.

64. An acoustic logging while drilling system for determining bed boundaries in the vicinity of a borehole, comprising:

a section of tubing;

an acoustic transmitter assembly located in said tubing section for transmitting an acoustic signal into the formation ahead of the drill bit, said transmitter assembly including a first transmitter located on one face of the tubing section, and a second transmitter assembly located on an opposite face of said tubing section for acoustic steering in the plane perpendicular to the tubing axis;

an acoustic receiver array located in said tubing section for receiving reflections of the acoustic signal, said receiver assembly including a first receiver and a second receiver and said first and second receivers are separated a predetermined distance; and a processor for performing geometric corrections on the reflections received by the acoustic receiver array based upon a time delay that is selected to investigate a particular volume cell external to the borehole.

65. A system as in claim 64, wherein said first receiver is aligned axially with said first transmitter, and said second receiver is aligned axially with said second transmitter.

66. A system as in claim 65, further comprising a first receiver array positioned between said first and said second receivers.

67. A system as in claim 66, further comprising a second receiver array positioned between said first and said second receivers.

68. A system as in claim 67, wherein said first and said second receiver arrays comprise a configuration of receivers positioned around the exterior of said tubing section.

69. A system as in claim 68, wherein each of said first and said second receiver arrays include three acoustic transducers.

70. A system as in claim 64, wherein the processor selects a time delay for each volume cell to achieve a maximum summed amplitude for the reflected signals.

71. A system as in claim 70, wherein the processor selects the volume cell with the maximum summed amplitude as indicating the location of the bed boundary.

72. A system as in claim 71, wherein the processor compares the maximum summed amplitude with a threshold value to determine if a bed boundary is present.

73. A system as in claim 71, wherein the processor uses the time delay associated with the volume cell with the maximum summed amplitude to calculate a path distance to the bed boundary.

74. A system as in claim 73, wherein the processor used the path distance to calculate a transit time.

75. A system as in claim 71, wherein the processor periodically determines bed boundary location during the drilling of the borehole, and associates each bed boundary location with depth.

* * * * *

UNITED STATES PATENT AND TRADEMARK OFFICE
CERTIFICATE OF CORRECTION

| | | |
|---|---|---|
| PATENT NO. | : 5,678,643 | Page 1 of 1 |
| APPLICATION NO. | : 08/544723 | |
| DATED | : October 21, 1997 | |
| INVENTOR(S) | : Carl A. Robbins et al. | |

It is certified that error appears in the above-identified patent and that said Letters Patent is hereby corrected as shown below:

On the Title Page, Item (57) Abstract, last line, the phrase "boundary in that particular volume call" should read "boundary in that particular volume cell".

Column 3, line 9, the phrase "The steerably bottomhole assembly" should read "The steerable bottomhole assembly".

Column 4, line 37, the phrase "determined by the LWD) system" should read "determined by the LWD system".

Column 15, equation 2, "1+" should read "1-".

Column 16, line 27, the phrase "such as, tube" should read "such as tube".

Column 16, line 28, the phrase "standby waves" should read "standing waves".

Column 21, line 10, the phrase "receiver army" should read "receiver array".

Signed and Sealed this
Thirteenth Day of March, 2012

David J. Kappos
*Director of the United States Patent and Trademark Office*